US007625160B2

(12) United States Patent
Zeiler et al.

(10) Patent No.: US 7,625,160 B2
(45) Date of Patent: Dec. 1, 2009

(54) CUTTING TOOL

(75) Inventors: Jeffrey M. Zeiler, Discovery Bay (HK);
David B. Griep, Rubicon, WI (US);
Mark D. Willer, Brookfield, WI (US);
Douglas Allen, Pewaukee, WI (US);
Richard Hohnl, Jr., Racine, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 261 days.

(21) Appl. No.: 11/681,546

(22) Filed: Mar. 2, 2007

(65) Prior Publication Data

US 2007/0280798 A1 Dec. 6, 2007

Related U.S. Application Data

(60) Provisional application No. 60/778,287, filed on Mar. 2, 2006, provisional application No. 60/786,654, filed on Mar. 28, 2006.

(51) Int. Cl.
*B23B 51/00* (2006.01)
(52) U.S. Cl. .................. 408/213; 408/214; 408/233; 408/1 R
(58) Field of Classification Search .......... 408/1 R, 408/212, 213, 214, 223–224, 196, 197–198, 408/231–233, 713, 227
See application file for complete search history.

(56) References Cited

U.S. PATENT DOCUMENTS

| 12,551 | A | * | 3/1855 | Hoagland | 408/200 |
|---|---|---|---|---|---|
| 90,755 | A | | 6/1869 | Ives | |
| 95,379 | A | * | 9/1869 | Richardson | 408/201 |
| 111,099 | A | * | 1/1871 | Walch | 408/195 |
| 124,089 | A | | 2/1872 | Shepardson | |
| 215,744 | A | * | 5/1879 | Heyn | 408/214 |
| 285,440 | A | * | 9/1883 | Swan | 408/214 |
| 329,660 | A | * | 11/1885 | Lord | 408/213 |
| 371,954 | A | | 10/1887 | Larger | |
| 458,640 | A | * | 9/1891 | Phillips | 408/214 |
| 469,901 | A | * | 3/1892 | Webb | 222/91 |
| 632,560 | A | | 9/1899 | Furbish | |
| 654,861 | A | * | 7/1900 | Tynan | 408/189 |
| 787,664 | A | * | 4/1905 | Converse | 408/195 |
| 897,041 | A | * | 8/1908 | Weller | 408/82 |
| 961,770 | A | * | 6/1910 | Grandperrin | 408/227 |
| 967,789 | A | * | 8/1910 | Le Baron | 408/201 |
| 1,047,466 | A | | 12/1912 | Wagner | |
| 1,104,987 | A | * | 7/1914 | Grimes | 408/232 |
| 1,140,988 | A | * | 5/1915 | Kunitz | 408/212 |
| 1,185,380 | A | * | 5/1916 | Davis | 408/205 |
| 1,275,889 | A | | 8/1918 | Flander | |
| 1,389,578 | A | * | 9/1921 | Charlton | 408/213 |
| 1,415,317 | A | * | 5/1922 | Crawford et al. | 408/194 |

(Continued)

FOREIGN PATENT DOCUMENTS

CA 2097971 12/1994

(Continued)

*Primary Examiner*—Daniel W Howell
(74) *Attorney, Agent, or Firm*—Michael Best & Friedrich LLP

(57) ABSTRACT

A cutting tool for a power tool. The cutting tool can include a tool body having a first end and a second end and an axis extending therebetween. The second end of the tool body can be engageable with the power tool. A feed screw can be supported in the tool body and can extend outwardly beyond the first end to engage a workpiece. A cutting blade can be removably supported in the tool body for engaging the workpiece.

18 Claims, 27 Drawing Sheets

U.S. PATENT DOCUMENTS

| | | | |
|---|---|---|---|
| 1,787,229 | A | 12/1930 | Zimmermann |
| 2,172,070 | A | 9/1939 | Palmgren |
| 2,179,070 | A | 11/1939 | Weise |
| 2,237,901 | A | 4/1941 | Chun |
| 2,577,987 | A | 12/1951 | Wison |
| 2,593,823 | A | 4/1952 | Wilson |
| 2,621,548 | A | 12/1952 | Williams |
| 2,779,361 | A | 1/1957 | McKiff |
| 2,794,469 | A | 6/1957 | Shortell |
| 2,812,791 | A | 11/1957 | Mackey |
| 2,835,293 | A * | 5/1958 | Mackey ............... 408/200 |
| 3,165,131 | A * | 1/1965 | Mackey ............... 408/201 |
| 3,262,474 | A | 7/1966 | Enders |
| 3,390,596 | A | 7/1968 | Trevathan |
| 3,609,056 | A | 9/1971 | Hougen |
| 3,610,768 | A | 10/1971 | Cochran |
| 3,648,508 | A | 3/1972 | Hougen |
| 3,687,565 | A * | 8/1972 | Byers et al. ............. 408/201 |
| 3,945,753 | A * | 3/1976 | Byers et al. ............. 408/201 |
| D239,519 | S | 4/1976 | Townsend |
| 4,090,807 | A | 5/1978 | Stewart |
| 4,239,427 | A | 12/1980 | Walton, II |
| 4,244,667 | A | 1/1981 | Timmons |
| 4,367,991 | A | 1/1983 | Grafe et al. |
| 4,406,334 | A | 9/1983 | Baumann et al. |
| 4,419,032 | A | 12/1983 | Flowers |
| 4,536,107 | A | 8/1985 | Sandy et al. |
| 4,589,807 | A | 5/1986 | Martin |
| 4,625,593 | A | 12/1986 | Schmotzer |
| 4,752,161 | A | 6/1988 | Hill |
| 4,768,901 | A | 9/1988 | Reinauer et al. |
| D298,633 | S | 11/1988 | Kenemore |
| 4,830,548 | A | 5/1989 | Kandarian |
| 4,841,824 | A | 6/1989 | Hartmann et al. |
| 4,900,202 | A | 2/1990 | Wienhold |
| 4,968,193 | A | 11/1990 | Chaconas et al. |
| 5,011,344 | A | 4/1991 | Johnson |
| 5,013,194 | A | 5/1991 | Wienhold |
| 5,193,951 | A | 3/1993 | Schimke |
| D338,607 | S | 8/1993 | Anderson |
| 5,288,183 | A | 2/1994 | Chaconas et al. |
| D347,150 | S | 5/1994 | Falconbridge |
| 5,358,361 | A | 10/1994 | Jurski |
| 5,423,640 | A | 6/1995 | Lindblom et al. |
| 5,570,978 | A | 11/1996 | Rees et al. |
| 5,586,847 | A | 12/1996 | Mattern, Jr. et al. |
| 5,649,794 | A | 7/1997 | Kress et al. |
| 5,695,304 | A | 12/1997 | Ebert |
| D392,297 | S | 3/1998 | Brutscher |
| 5,803,677 | A | 9/1998 | Brutscher et al. |
| 5,807,039 | A | 9/1998 | Booher et al. |
| 5,813,802 | A | 9/1998 | Ajimi et al. |
| 5,820,319 | A | 10/1998 | Hull et al. |
| 5,829,540 | A | 11/1998 | Peay et al. |
| 5,934,843 | A | 8/1999 | Brask et al. |
| D416,567 | S | 11/1999 | Vogelsanger |
| 5,975,814 | A | 11/1999 | Pomp |
| 6,024,520 | A * | 2/2000 | Haughton et al. ........... 408/199 |
| D422,459 | S | 4/2000 | Webb et al. |
| 6,045,302 | A | 4/2000 | Orr |
| 6,053,675 | A | 4/2000 | Holland et al. |
| 6,109,841 | A | 8/2000 | Johne |
| 6,179,718 | B1 | 1/2001 | Morath et al. |
| D438,219 | S | 2/2001 | Brutscher |
| 6,199,872 | B1 | 3/2001 | Hasan |
| 6,261,033 | B1 | 7/2001 | Thames et al. |
| 6,270,297 | B1 | 8/2001 | Fang et al. |
| 6,302,408 | B1 | 10/2001 | Zierpka |
| 6,347,914 | B1 | 2/2002 | Boyle et al. |
| 6,354,773 | B1 | 2/2002 | Konen |
| 6,354,177 | B2 | 3/2002 | Peters |
| 6,354,774 | B1 | 3/2002 | Haughton et al. |
| 6,394,714 | B2 | 5/2002 | Eberhard |
| 6,394,715 | B1 | 5/2002 | Boyle et al. |
| D459,741 | S | 7/2002 | Erickson |
| 6,457,916 | B2 | 10/2002 | Wienhold |
| 6,488,452 | B1 | 12/2002 | Hoskins et al. |
| 6,511,268 | B1 | 1/2003 | Vasudeva et al. |
| 6,543,789 | B2 | 4/2003 | Frenzel et al. |
| 6,543,959 | B1 | 4/2003 | Jore |
| 6,561,523 | B1 | 5/2003 | Wienhold |
| 6,568,876 | B2 | 5/2003 | Augustin |
| 6,599,063 | B1 | 7/2003 | Capstran |
| 6,612,788 | B2 * | 9/2003 | Thomas et al. .............. 408/214 |
| 6,652,202 | B2 | 11/2003 | Remke et al. |
| 6,659,473 | B2 | 12/2003 | Below et al. |
| 6,695,321 | B2 | 2/2004 | Bedi et al. |
| 6,702,529 | B1 | 3/2004 | Tagtstrom et al. |
| 6,705,807 | B1 | 3/2004 | Rudolph et al. |
| 6,722,667 | B2 | 4/2004 | Cantlon |
| 6,817,429 | B2 | 11/2004 | Sollami |
| 6,874,978 | B2 | 4/2005 | Gongola |
| 6,929,434 | B2 | 8/2005 | Prokop |
| D509,519 | S | 9/2005 | Sollami |
| 6,959,631 | B2 | 11/2005 | Sako |
| 6,968,912 | B2 | 11/2005 | Sollami et al. |
| D513,273 | S | 12/2005 | Sollami |
| D515,115 | S | 2/2006 | Sollami |
| D522,339 | S | 6/2006 | Kimura |
| 7,100,714 | B1 | 9/2006 | Sollami |
| 7,168,511 | B2 | 1/2007 | Woods et al. |
| D551,269 | S | 9/2007 | Burke, III |
| 7,264,427 | B1 | 9/2007 | Kunz-Mujica |
| 2001/0013430 | A1 | 8/2001 | Hauptmann et al. |
| 2001/0019687 | A1 | 9/2001 | Eberhard |
| 2002/0081165 | A1 | 6/2002 | Hecht |
| 2002/0106254 | A1 | 8/2002 | Rudolph |
| 2002/0141838 | A1 | 10/2002 | Thomas et al. |
| 2003/0068208 | A1 | 4/2003 | Eberhard |
| 2003/0103822 | A1 | 6/2003 | Wirth et al. |
| 2003/0230862 | A1 | 12/2003 | Peters et al. |
| 2004/0042861 | A1 | 3/2004 | Capstran |
| 2004/0101376 | A1 | 5/2004 | Shemeta |
| 2004/0101379 | A1 | 5/2004 | Mabuchi et al. |
| 2004/0175244 | A1 | 9/2004 | Otten |
| 2004/0179912 | A1 | 9/2004 | Quanz |
| 2004/0265080 | A1 | 12/2004 | Danielsson et al. |
| 2005/0025594 | A1 | 2/2005 | Lindblom |
| 2005/0105981 | A1 | 5/2005 | Byrley et al. |
| 2005/0135887 | A1 | 6/2005 | Borschert et al. |
| 2005/0249562 | A1 | 11/2005 | Frejd |
| 2005/0249563 | A1 | 11/2005 | Scott et al. |
| 2007/0172325 | A1 | 7/2007 | Ebert |
| 2007/0212179 | A1 | 9/2007 | Khangar et al. |
| 2007/0277656 | A1 | 12/2007 | Zeiler et al. |
| 2008/0008548 | A1 | 1/2008 | Corso et al. |

FOREIGN PATENT DOCUMENTS

| | | |
|---|---|---|
| CA | 2313749 | 9/2001 |
| DE | 282475 | 8/1913 |
| DE | 3719758 | 1/1989 |
| DE | 3738000 | 5/1989 |
| EP | 0870561 | 10/1998 |
| GB | 674018 | 6/1952 |
| GB | 791571 | 3/1958 |
| JP | 11-179720 | 7/1999 |
| JP | 11188518 | 7/1999 |

* cited by examiner

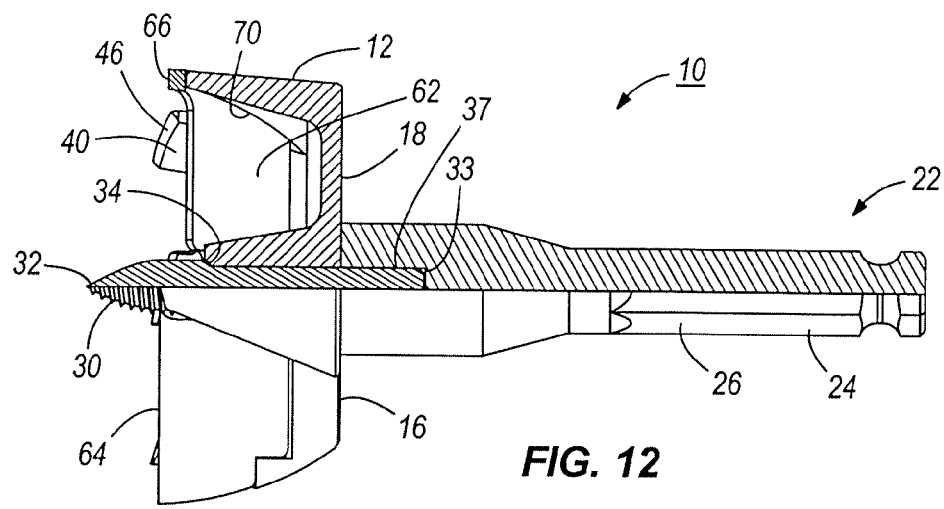
FIG. 12
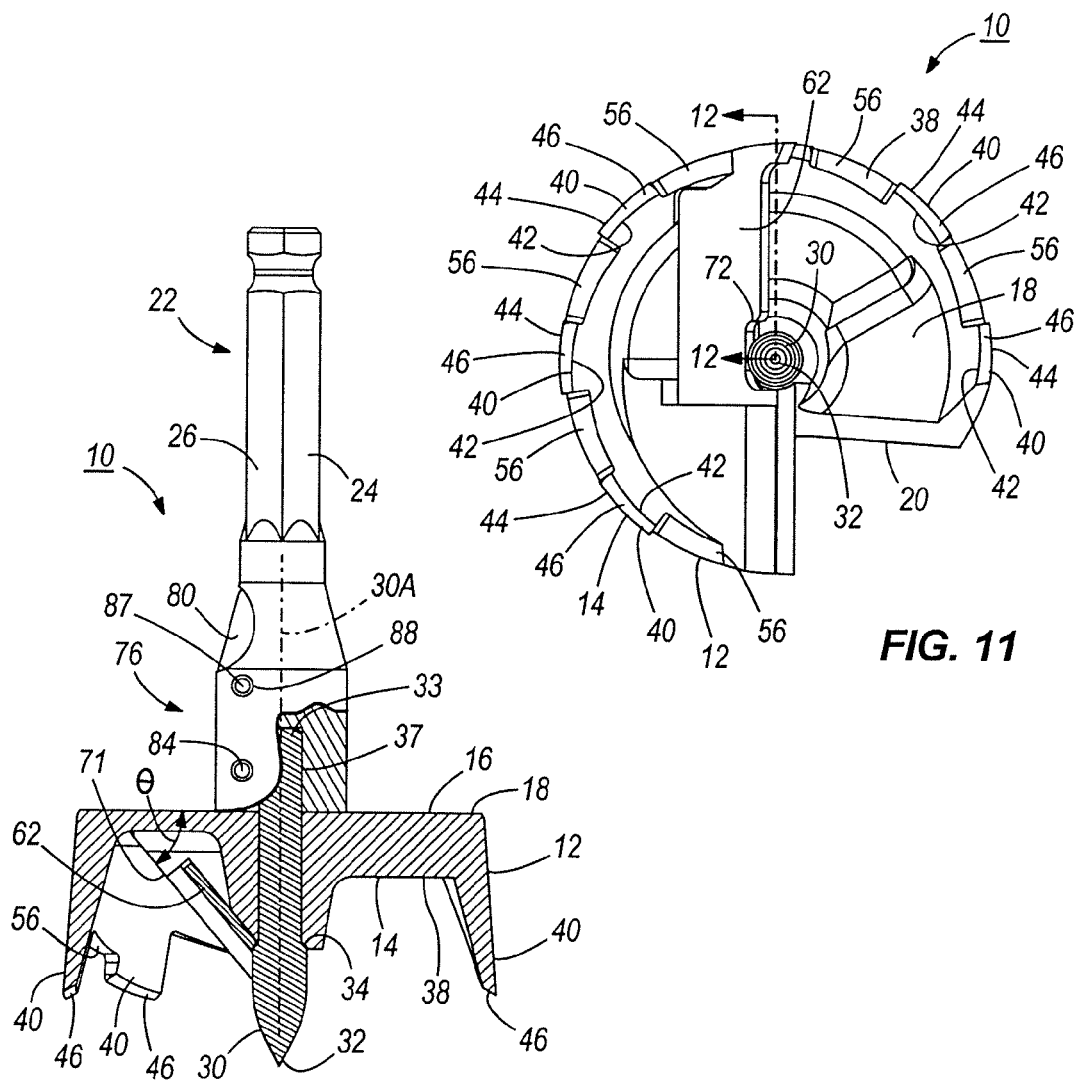
FIG. 11
FIG. 10

CUTTING TOOL

FIELD OF THE INVENTION

The present application claims priority to U.S. Provisional Patent Application Serial No. 60/778,287, filed Mar. 2, 2006, the entire contents of which is hereby incorporated by reference. The present application also claims priority to U.S. Provisional Patent Application Serial No. 60/786,654, filed Mar. 28, 2006, the entire contents of which is hereby incorporated by reference.

RELATED APPLICATIONS

The present invention relates to cutting tools and, more particularly, to a rotary cutting tool for a power tool.

SUMMARY

In some embodiments, the invention provides a cutting tool, including a body, a feed screw, and a blade removably supported in the body adjacent to the feed screw. The cutting tool can include teeth positioned circumferentially around and extending outwardly from the body and a locking mechanism for removably securing the blade to the body. In some embodiments, the locking mechanism is movable relative to the body between a locked position, in which the locking mechanism secures the blade to the body, and an unlocked position, in which the blade is removable from the body.

In addition, the present invention provides a cutting tool including a body having a plurality of teeth and a blade removably supported in the body. The cutting tool can also include a locking mechanism, which orients the blade with respect to at least one of the plurality of teeth to maintain a desired spacing between the blade and the at least one of the plurality of teeth.

The present invention also provides a method of operating a cutting tool, including the acts of providing a cutting tool having a tool body and a plurality of teeth positioned along the body, removably securing a blade to the body, and cutting a workpiece with the blade and the teeth. The method can also include the acts of removing the blade from the body and inserting a second blade into the body.

In some embodiments, the invention provides a cutting tool for a power tool, the cutting tool including a tool body having a first end and a second end and an axis extending therebetween, the second end being engageable with the power tool. A feed screw can be supported in the tool body and can extend outwardly beyond the first end to engage a workpiece. A cutting blade can be removably supported in the tool body for engaging the workpiece.

In some embodiments, the invention provides a method of assembling a cutting tool for a power tool. The method includes providing a tool body having a first end and a second end and an axis extending therebetween, the second end being engageable with the power tool. The method further includes coupling a feed screw to the tool body such that the feed screw extends outwardly beyond the first end to engage a workpiece and removably coupling a cutting blade to the tool body for engaging the workpiece.

In some embodiments, the invention provides a cutting tool for a power tool, the cutting tool including a tool body having a first end and a second end and an axis extending therebetween, the second end being engageable with the power tool. A cutting blade can be removably supported in the tool body for engaging a workpiece, and the cutting blade can include a first cutting edge supportable adjacent a radially-outermost portion of the first end of the tool body and a second cutting edge extending radially across the first end of the tool body from the axis toward the radially-outermost portion.

In some embodiments, the invention provides a method of assembling a cutting tool for a power tool. The method includes providing a tool body having a first end and a second end and an axis extending therebetween, the second end being engageable with the power tool. The method further includes removably coupling a cutting blade to the tool body for engaging a workpiece, the cutting blade including a first cutting edge supportable adjacent a radially-outermost portion of the first end of the tool body and a second cutting edge extending radially across the first end of the tool body from the axis toward the radially-outermost portion.

Other aspects of the invention will become apparent by consideration of the detailed description and accompanying drawings.

BRIEF DESCRIPTION OF THE DRAWINGS

FIG. 10 is a partial section view of the cutting tool shown in FIG. 1.

FIG. 11 is front view of the cutting tool shown in FIG. 1.

FIG. 12 is a partial section view taken along line 12-12.

DETAILED DESCRIPTION

Figure 1:
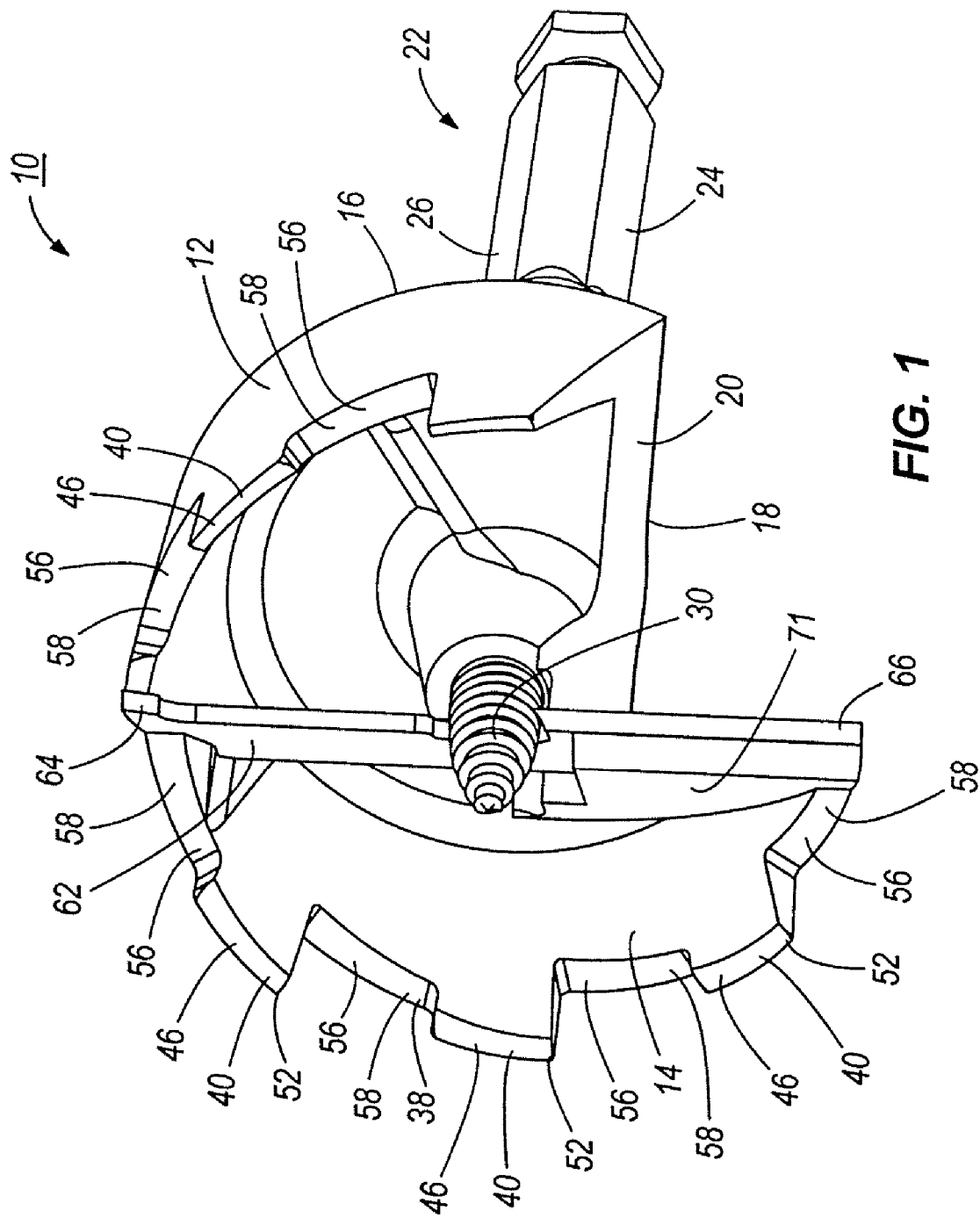
FIG. 1 is a front perspective view of a cutting tool according to some embodiments of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-17 illustrate a cutting tool or bit 10 for use with a power tool, such as, for example, a drill, a driver drill, a screwdriver, and the like. As shown in FIGS. 1-17, the cutting tool 10 includes a generally cylindrically-shaped body 12 having a first or workpiece-engaging end 14 and a second or rearward end 16. The second end 16 includes a base 18 having an opening 20 to at least partially facilitate chip removal from the body 12 of the cutting tool 10.

A connecting structure 22 is supported on the second end 16 of the body 12 and includes an elongated rearwardly-extending drive shaft 24 configured to be received in a tool holder or chuck of a power tool. In the illustrated embodiment of FIGS. 1-17, the drive shaft 24 has a substantially hexagonal cross-sectional shape and includes six flat sides 26. In other embodiments, the drive shaft 24 can have other cross-sectional shapes, such as, for example, round, triangular, rectangular, trapezoidal, or any other polygonal shape, oval, irregular, and the like and can include one or more flat sides 26.

A feed shaft 30 extends forwardly from the first end 14 of the body 12. In the illustrated embodiment of FIGS. 1-17, the feed shaft 30 is generally aligned with the drive shaft 24 along a longitudinal axis 30A (shown in FIG. 10). In other embodiments, the feed shaft 30 and the drive shaft 24 can have other relative orientations.

As shown in FIGS. 1-17, the feed shaft 30 includes a tapered first end 32 and a second end 33. In some embodiments, threads extend radially outwardly from the first end 32 of the feed shaft 30 and extend helically around the first end 32 for threadably engaging a workpiece. The configuration (size, shape, pitch, number, etc.) of the threads on the first end 32 and the shape or profile of the first end itself may vary and may be particularly suited for particular applications (e.g., material to be cut). In the illustrated embodiment, a ridge 34 extends circumferentially around the feed shaft 30 adjacent to the first end 32 and a recess 36 (shown in FIG. 9) extends around at least a portion of circumference of the second end 33 of the feed shaft 30. Tile second end 33 of the feed shaft 30 is received in, a cavity, or recess 37 in the drive shaft 24.

A rim 38 extends circumferentially around the first end 14 of the body 12. As shown in FIGS. 1-17, teeth 40 extend axially outwardly from the rim 38 and are spaced circumferentially around the rim 38. In the illustrated embodiment of FIGS. 1-17, five teeth 40 are spaced circumferentially around the rim 38 at regular intervals. In other embodiments, one, two, three, four, six, or more teeth 40 can be spaced circumferentially around the rim 38 at regular or irregular intervals.

In some embodiments, outer ends of the teeth 40 are tapered or sloped to provide sharpened cutting edges. In the illustrated embodiment of FIGS. 1-17, outer surfaces of the teeth 40 are tapered or sloped from a radial inner side 42 toward a radial outer side 44 such that a raised cutting edge 46 is formed around the outer circumference of each cutting tooth 40. Alternatively or in addition, the teeth 40 can be sloped or tapered in a circumferential direction. As shown in FIGS. 1-17, the teeth 40 can slope upwardly from a trailing edge 48, which extends outwardly away from the base 18 a first distance, toward a leading edge 50, which extends outwardly away from the base 18 a second larger distance, to provide a sharpened cutting tip 52 adjacent to the leading edge 50 of each tooth 40. In these embodiments, the cutting edge 46 can be oriented at an angle $\alpha$ with respect to the base 18 of the body 12.

As shown in FIGS. 1-17, gullets 56 extend axially through the body 12 between adjacent cutting teeth 40. In some embodiments, such as the illustrated embodiment of FIGS. 1-17, the base 58 of each gullet 56 is oriented at an angle $\beta$ with respect to the base 18 of the body 12 such that a trailing or downstream end of each gullet 56 is spaced a first distance from the base 18 of the body 12 and a leading end or upstream end of each gullet 56 is spaced a second larger distance from the base 18 of the body 12. In some such embodiments, the angle $\alpha$ of cutting edge 46 of at least one of the teeth 40 is substantially equal to the angle $\beta$ of the base 58 of at least one of the gullets 56.

The cutting tool 10 also includes a blade 62 supported in the body 12 and having a first cutting or lifting edge 64 and a second cutting or lifting edge 66. In the illustrated embodiment of FIGS. 1-17, the blade 62 includes a blade body 68 supported in a slot 70 formed in the body 12. The blade 62 is oriented at an angle $\theta$ (shown in FIG. 10) with respect to the base 18 of the body 12. The body 12 of the cutting tool 10 can also include a ramp 71 for supporting the blade 62 in a desired orientation in the body 12. As shown in FIGS. 6, 7, and 9-13, the blade body 68 defines an opening 72 extending between the first and second edges 64, 66. In some embodiments, such as the illustrated embodiment of FIGS. 1-17, and as explained in greater detail below, the feed shaft 30 is engageable with the blade body 68 to secure the blade 62 in the body 12 of the cutting tool 10.

The blade 62 may be constructed of one or more materials suitable for a cutting operation including, but not limited to, low alloy and alloyed steel and non-ferrous materials and various heat-treated metals, ceramic, composite materials (including some plastics). The first and second edges 64 and 66 and/or the blade body 68 may be coated using various coating technologies, such as, for example chemical vapor deposition (CVD), physical vapor deposition (PVD), etc.

Figure 14:
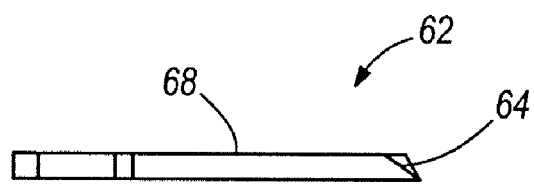
FIG. 14 is a side view of the blade shown in FIG. 13.
Figure 14A:
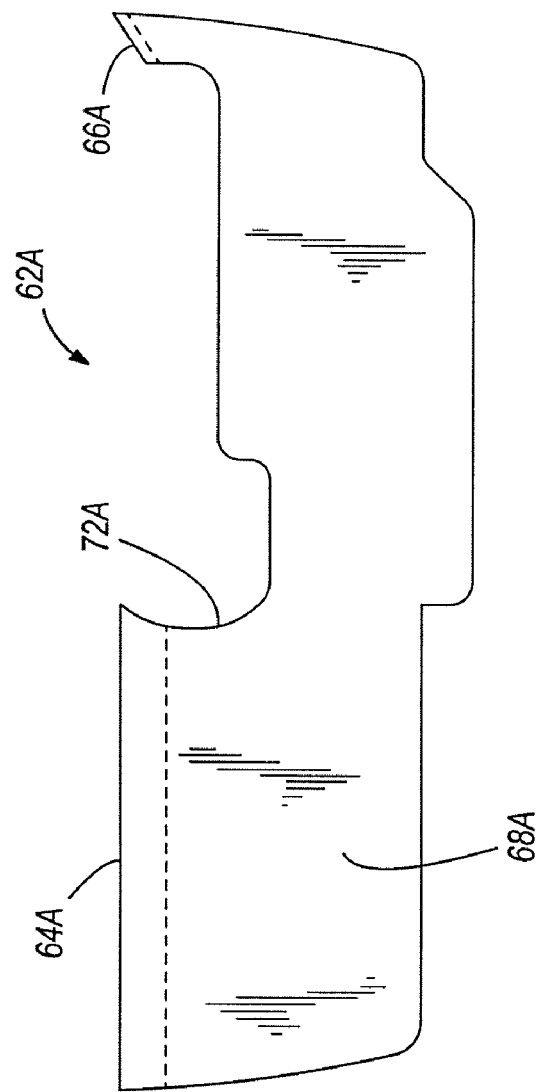
FIG. 14A is a rear view of an alternate blade of the cutting tool shown in FIG. 1.
Figure 14B:
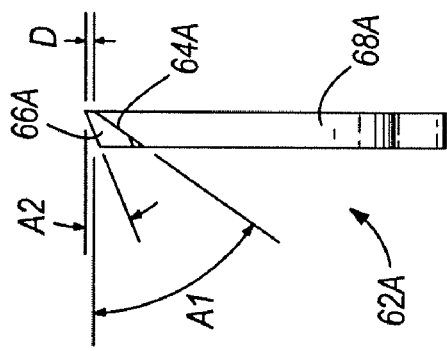
FIG. 14B is a side view of the blade shown in FIG. 14A.

FIGS. 14A and 14B illustrate an alternate blade 62A, which includes some generally similar features as the blade 62, which are given similar reference numerals, appended by the letter "A". In some embodiments, such as the illustrated embodiment of FIG. 14B, the first edge 64A of the blade 62A extends outwardly from the blade body 68A a first distance, and the second edge 66A of the blade 62A extends outwardly from the blade body 68A a second distance greater than the first distance. In some such embodiments, the second edge 66A extends about 0.02 inches further than the first edge 64A. The difference in the extended lengths of the first edge 64A and the second edge 66A is labeled D.

Returning now to FIGS. 13 and 14, the thickness of the blade 62 as illustrated is only exemplary, and in some embodiments, the blade 62 is provided with a relative thickness that is less than or greater than that shown in the figures. For example, the blade 62A of the illustrated embodiment of FIGS. 14A and 14B has a relative thickness that is greater than that of the blade 62 of the illustrated embodiment of FIGS. 13 and 14. The slot 70 in the body 12 can be sized to receive the blade 62 or 62A with a small clearance therebetween. In some embodiments, the blade 62 has a thickness of about 0.080 inches. In other embodiments, the blade 62 or 62A and the slot 70 can have other sizes and dimensions.

As best illustrated in FIG. 14B, the first edge 64A and the second edge 66A are oriented at different angles with respect to the cutting end of the blade 62A. In some embodiments, the first edge 64A is oriented at a first angle A1 and the second edge 66A is oriented at a second angle A2 with respect to the cutting end of the blade 62A. The first angle A1 can be greater than the second angle A2. In some embodiments, the first angle A1 is about 55 degrees and the second angle A2 is about 20 degrees.

In some embodiments, the blade body 68 is formed from two materials. In these embodiments, one or both of the first and second edges 64, 66 can be formed from a first material, such as, for example, high-speed steel, machine steel, or the like, and the blade body 68 can be formed from a second material, such as, for example, spring-steel or another relatively flexible material, which allows for slight elastic deformation during operation of the cutting tool 10. In these embodiments, the two materials can be bonded together. For example, in some embodiments, one or both of the first and second edges 64, 66 can be laser welded to the blade body 68. In other embodiments, the first and second edges 64, 66 can be coated, hardened, and/or tempered.

Figure 14C:
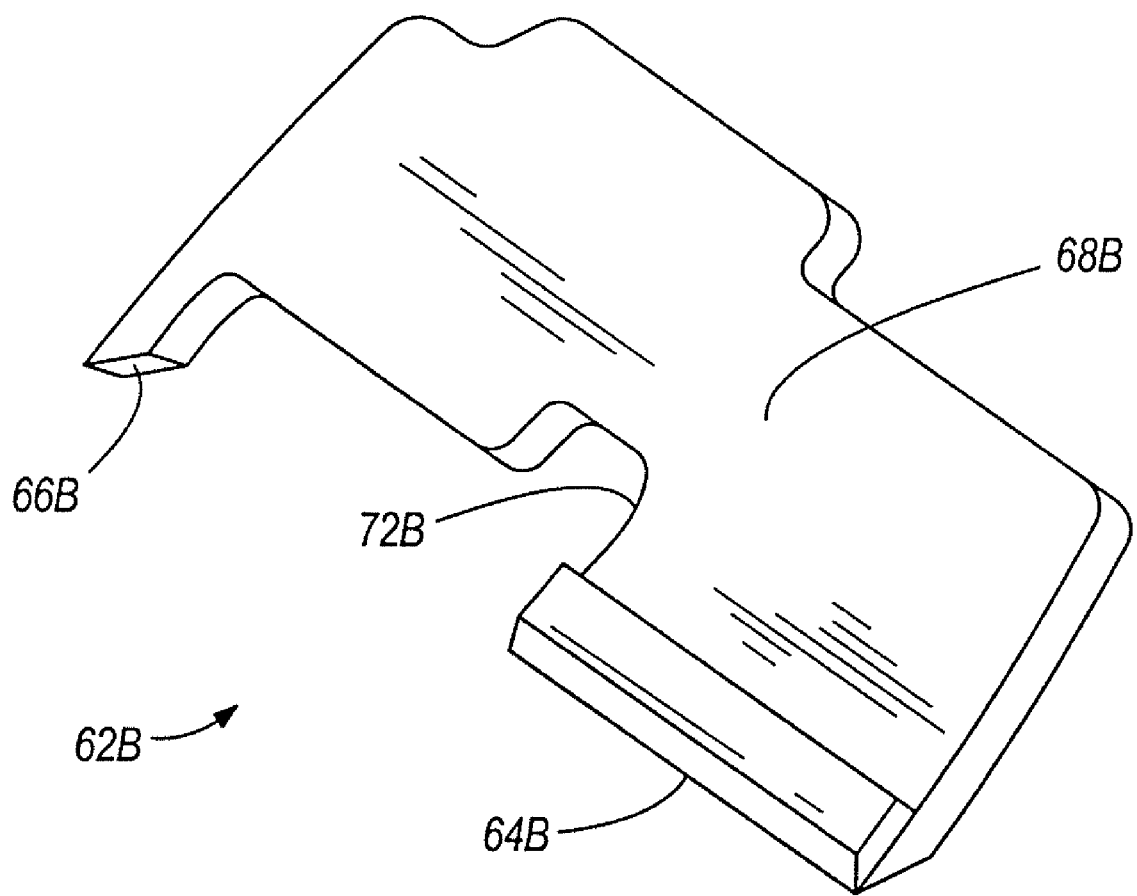
FIG. 14C is a perspective view of another alternate blade of the cutting tool shown in FIG. 1.
Figure 15:
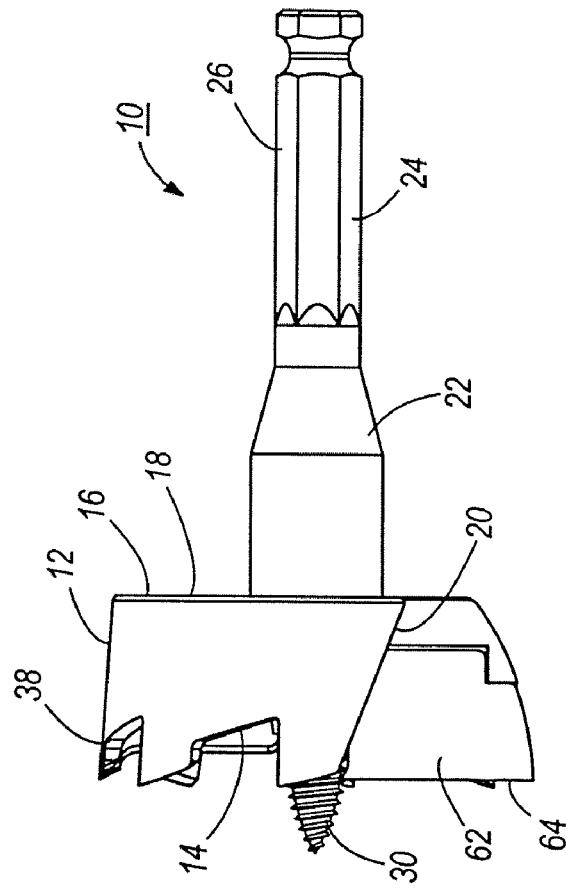
FIG. 15 is a side view of the cutting tool shown in FIG. 1.
Figure 16:
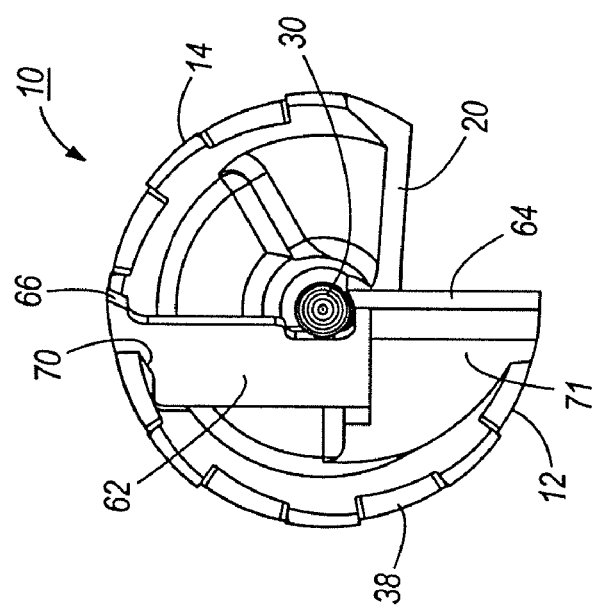
FIG. 16 is a front view of the cutting tool shown in FIG. 1.
Figure 17:
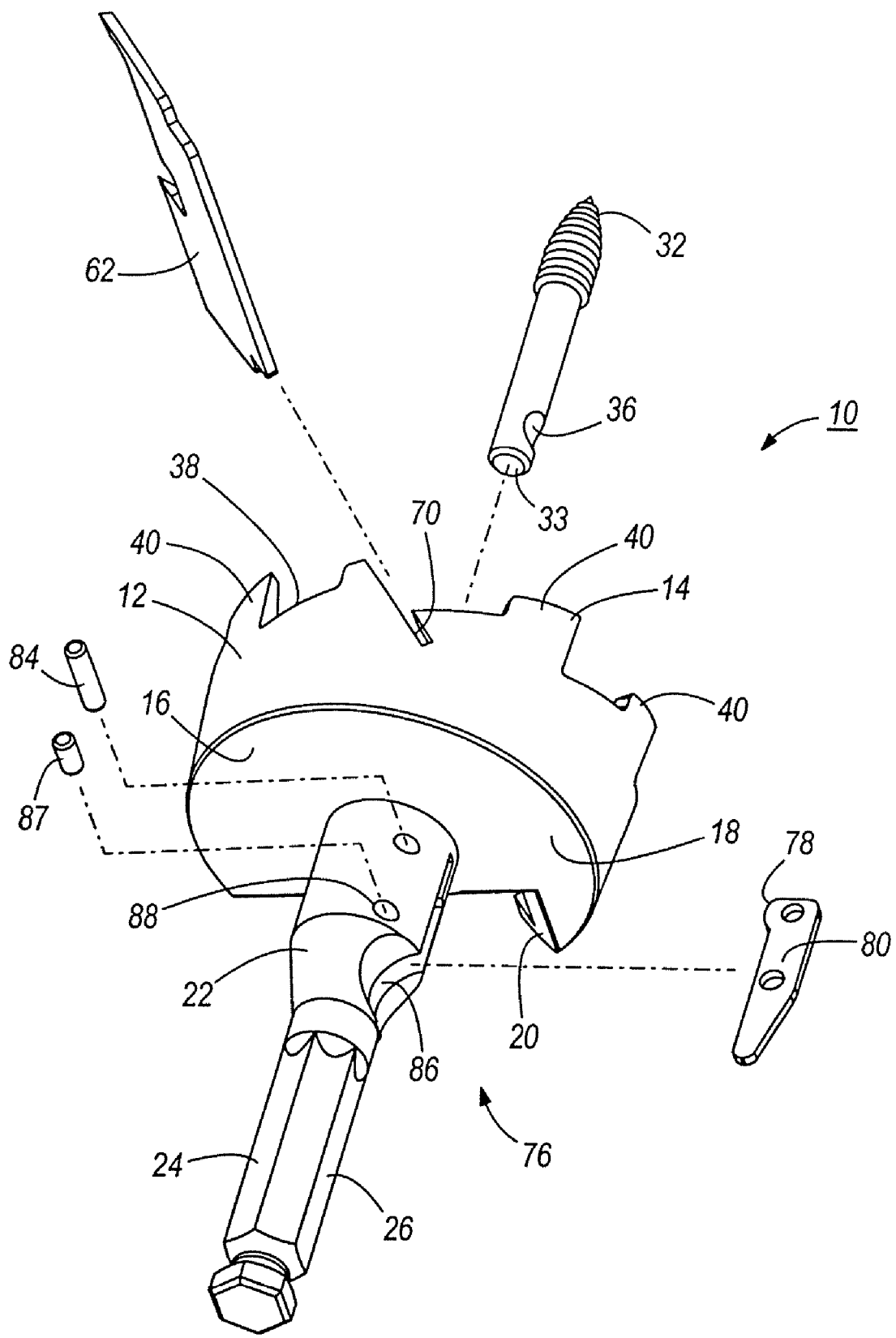
FIG. 17 is an exploded view of the cutting tool shown in FIG. 1.

FIG. 14C illustrates a blade 62B having a separately-formed first cutting edge 64B that is connected to the blade body 68B. The blade 62B is otherwise generally similar to the blades 62 and 62A described above. Similar reference numerals are used for similar features, those in FIG. 14C being appended with the letter "B". The first cutting edge 64B may be constructed of a first material (e.g., carbide, ceramic, etc.), and the blade body 68B may be constructed of a second material different than the first material. The first material may be particularly suited for a cutting operation and may be harder and more rigid than the second material. Additionally, although not illustrated, any of the blades 62, 62A, and 62B shown and described herein may include one or more serrated and/or discontinuous cutting edges and/or tip and edge profiles other than those shown and described herein.

In some embodiments, as shown in FIGS. 6, 7, 11-13, 15, and 16, the blade body 68 includes first and second shoulders on the end opposite the first and second edges 64, 66. In some such embodiments, the shoulders are formed by notches extending through the blade body 68. The shoulders engage corresponding structure on the cutting tool body 12 to maintain the position of the blade 62 with respect to the cutting tool body 12. Particularly, the shoulders prevent and/or reduce movement of the blade body 68 relative to the cutting tool body 12 in a direction substantially perpendicular to the axis of the cutting tool body 12.

In the illustrated embodiment, the shoulders are formed by substantially square notches. However, in some embodiments, the shoulders may be formed by notches of a different size, shape, and/or orientation. Furthermore, in some embodiments (such as the blade 62A illustrated in FIGS. 14A and 14B and the blade 62B illustrated in FIG. 14C), the two shoulders are of dissimilar size, shape, and/or orientation such that the blades 62A and 62B are insertable into the cutting tool body 12 in only a single predetermined orientation.

As shown in FIGS. 1-17, the cutting tool 10 can include a locking mechanism 76 for securing the blade 62 in the body 12 of the cutting tool 10. In some embodiments, such as the illustrated embodiment of FIGS. 1-17, the locking mechanism 76 can include a locking member 78 which is supported in the connecting structure 22 of the cutting tool 10 and is movable relative to the connecting structure 22 between a locked position (shown in FIGS. 2-4 and 8-10 and an unlocked position (shown in FIGS. 5-7). The locking mechanism 76 can also include an actuator 80 for moving the locking member 78 between the locked position and the unlocked position.

In the unlocked position, the locking member 78 is moved away from and out of engagement with the feed shaft 30 so that the feed shaft 30 and/or the blade 62 can be removed from the body 12 of the cutting tool 10 so that the feed shaft 30 and/or the blade 62 can be replaced or repaired.

As the locking member 78 is moved toward the locked position, the locking member 78 cammingly engages the recess 36 formed on the second end 33 of the feed shaft 30 to seat the blade 62 in the slot 70 in the body 12 of the cutting tool 10. This camming action can also orient the first edge 64 of the blade 62 and/or the second edge 66 of the blade 62 in a desired orientation with respect to the cutting edge 46 of one or more of the teeth 40. In the illustrated embodiment of FIGS. 1-17, this camming action of the locking member 78 moves the blade body 68 downwardly along the ramp 71 into the slot 70 and toward the base 18 of the body 12 so that the first edge 64 of the blade 62 extends outwardly from the base 18 a first distance and the second edge 66 of the blade along with the cutting edges 46 of the teeth 40 extends outwardly from the base 18 a second greater distance. In some such embodiments, when the locking member 78 is moved toward the locked position, the second edge 66 of the blade 62 and the cutting edges 46 of the teeth 40 extend outwardly from the base 18 of the body 12 in an axial direction about 0.02 inches beyond the first edge 64 of the blade 62. In these embodiments, the blade 62 can be replaced and be reset in the body 12 of the cutting tool 10 in a desired orientation without requiring the operator to perform any complicated setup or measuring operations.

Figure 5:
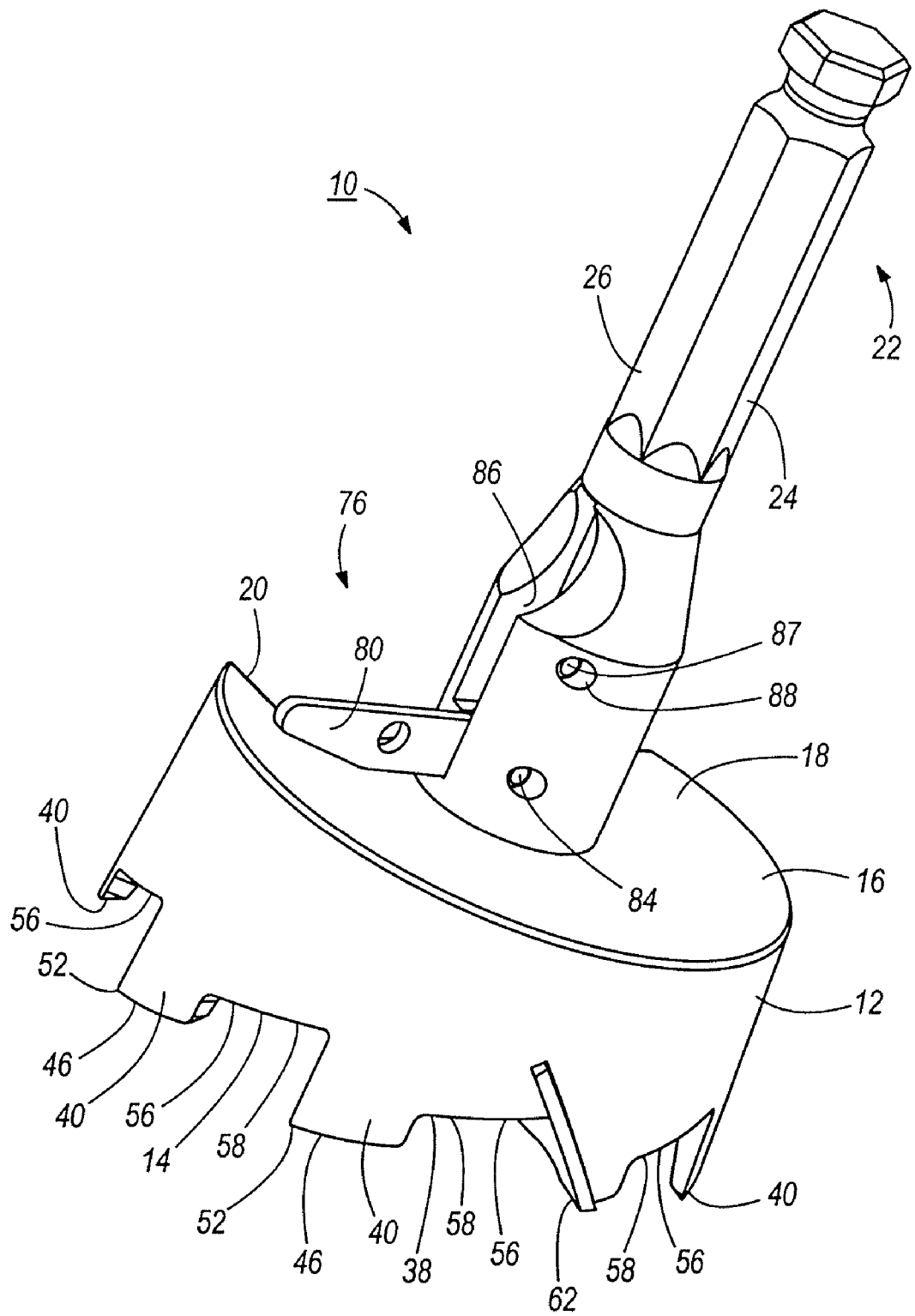
FIG. 5 is a rear perspective view of the cutting tool shown in FIG. 1 with the locking mechanism in an unlocked position.
Figure 6:
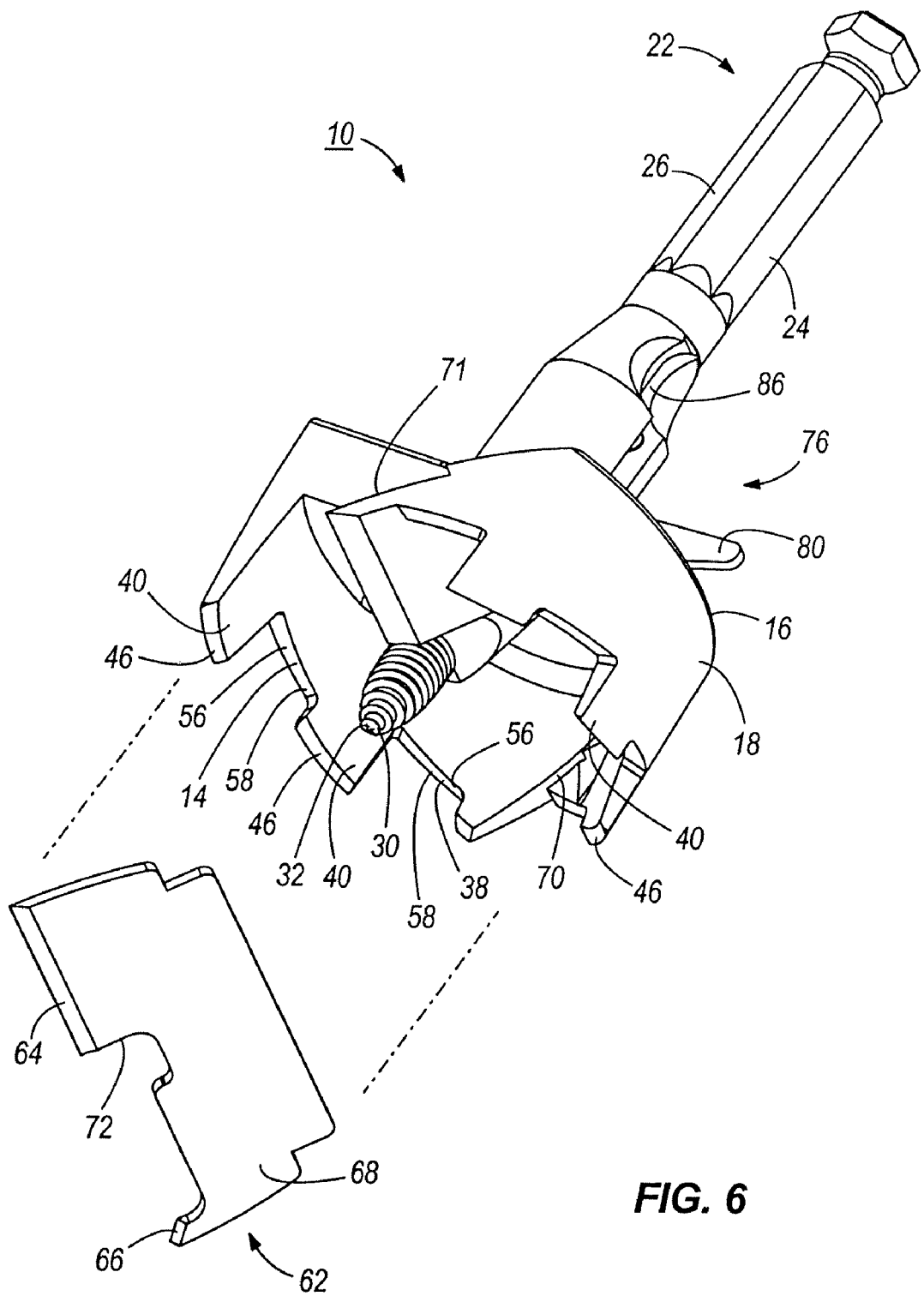
FIG. 6 is a front exploded perspective view of the cutting tool shown in FIG. 1.
Figure 7:
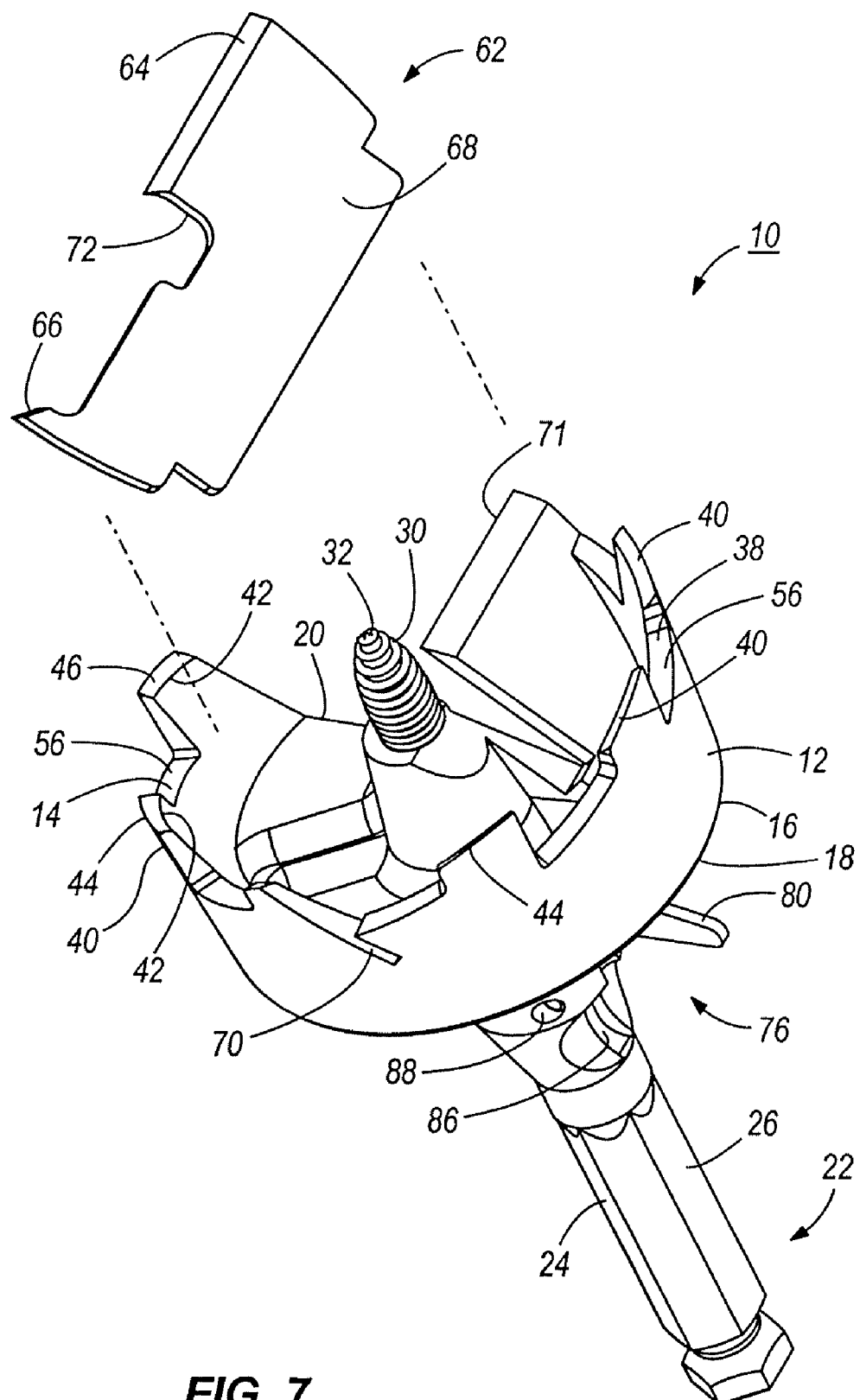
FIG. 7 is another front exploded perspective view of the cutting tool shown in FIG. 1.
Figure 9:
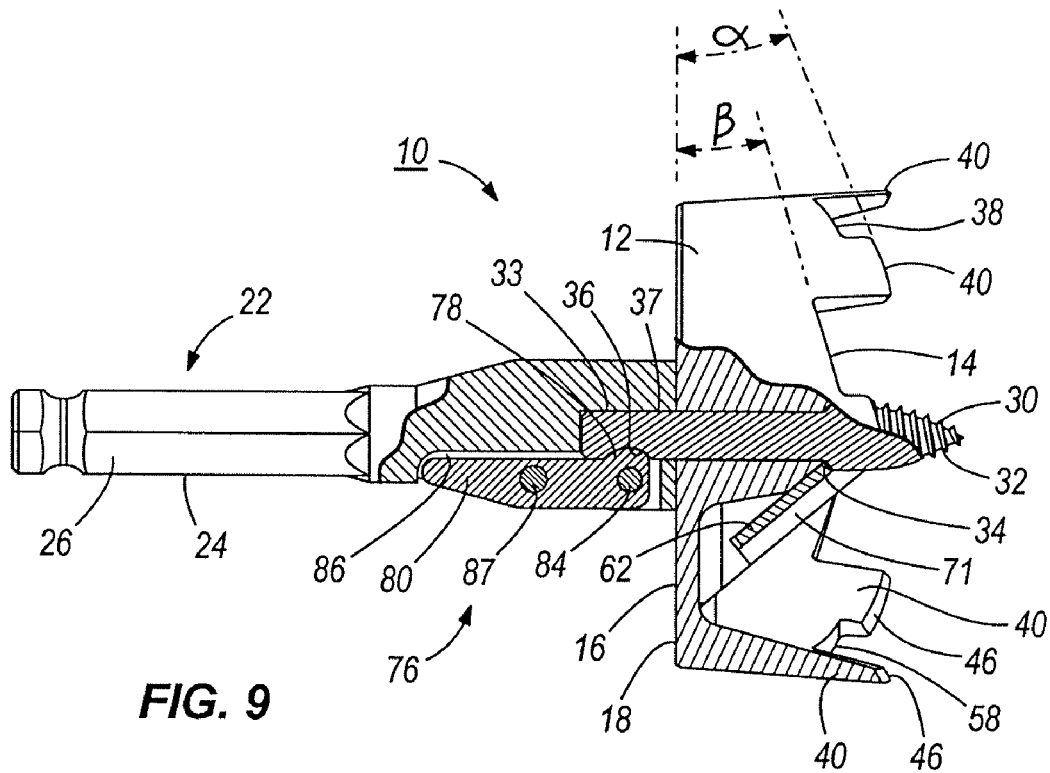
FIG. 9 is a partial section view of the cutting tool shown in FIG. 1.
Figure 8:
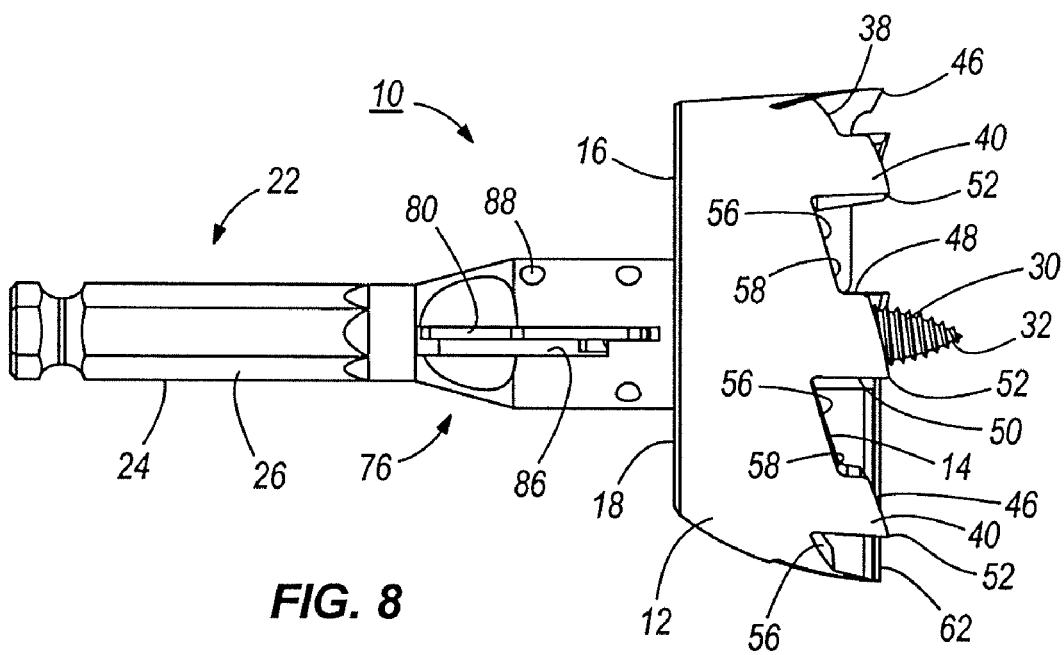
FIG. 8 is a side view of the cutting tool shown in FIG. 1.
Figure 13:
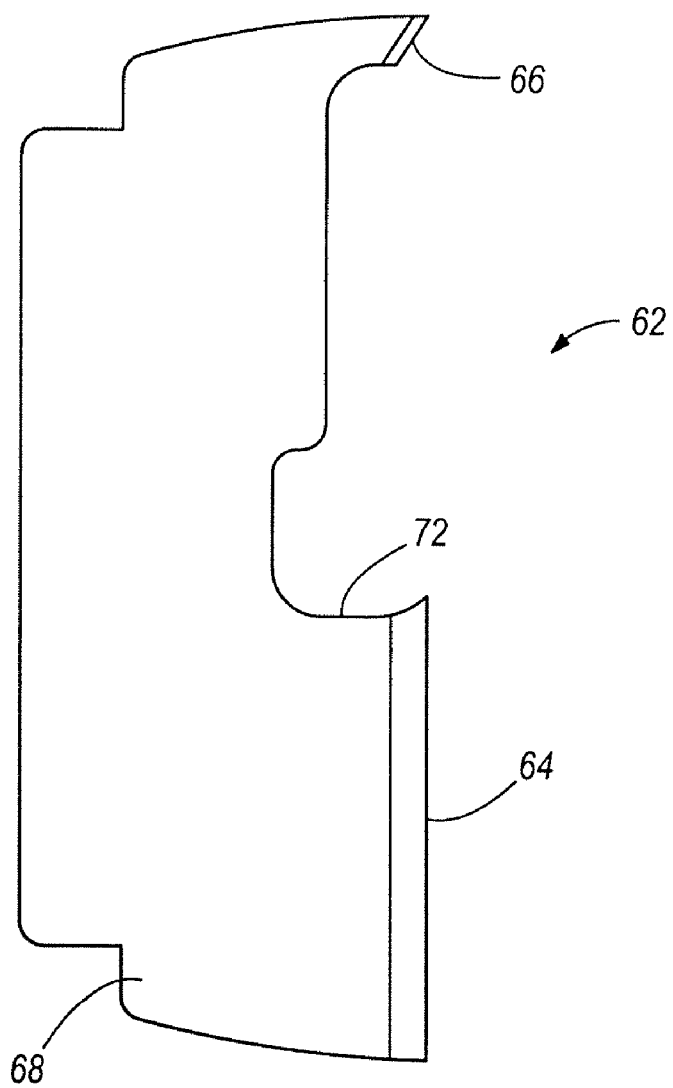
FIG. 13 is an enlarged side view of a blade of the cutting tool shown in FIG. 1.

In the illustrated embodiment of FIGS. 1-17, an operator can pivot the actuator 80 about a pivot member or pin 84 defining a pivot axis, which extends radially through the connecting structure 22, to move the locking member 78 between the locked position and the unlocked position. As shown in FIGS. 2-4 and 8-10, an operator moves the actuator 80 toward a first position, in which the actuator 80 is supported in a recess 86 formed in the connecting structure 22 and in which the actuator 80 is generally axially aligned with the drive shaft 24 of the cutting tool 10, to move the locking member 78 toward the locked position. As shown in FIGS. 5-7, an operator can move the actuator 80 toward a second position, in which the actuator 80 is moved out of the recess 86 and in which at least a portion of the actuator 80 extends radially outwardly from the connecting structure 22 of the cutting tool 10, to move the locking member 78 toward the unlocked position.

In some embodiments, a securing member, such as a pin 87, is engageable with a corresponding recess 88 in the connecting structure 22 and a corresponding recess in the actuator 80 to maintain the actuator 80 in the locked position. In other embodiments, the actuator 80 can include an outwardly extending projection, which is engageable in the recess 88 to maintain the actuator 80 in the locked position in the recess 86 in the connecting structure 22. In still other embodiments, the locking mechanism 76 can include one or more magnets for maintaining the actuator 80 in the locked position.

In the illustrated embodiment, the engagement between the recess 36 of the feed shaft 30 and the locking member 78 not only fixes the feed shaft 30 axially, but also prevents relative rotation between the feed shaft 30 and the cutting tool body 12. The feed shaft 30 and the recess 37 may additionally be provided with corresponding hexagonal or otherwise interengaging cross-sections to prevent relative rotation therebetween. In other embodiments, some of which are described further below, the feed shaft 30 is fixed axially and rotationally by separate mechanisms.

During operation, an operator secures the connecting structure 22 of the cutting tool 10 to a power tool and positions the cutting, tool 10 above or in front of a work piece. The operator then centers the feed shaft 30 above the intended cutting location and activates the power tool to rotate the cutting tool 10 about the axis of the feed shaft 30. As the cutting tool 10 rotates, the threads of the feed shaft 30 are driven into the workpiece. The engagement between the threads and the workpiece draws the cutting tool 10 into the workpiece.

Continued rotation of the cutting tool 10 moves the cutting edges 46 of the teeth 40 into engagement with the workpiece. As the teeth 40 rotate, the teeth 40 cut a circular path in the workpiece. As the power tool and the threads on the feed shaft 30 continue to move the cutting tool 10 into the workpiece, the first cutting edge 64 and/or the second cutting edge 66 are moved into engagement with the workpiece and begin to remove chips from the workpiece. In general these chips are formed when the teeth 40 score the workpiece. The first cutting edge 64 then lifts the chips from the workpiece and directs the chips upwardly toward the opening 20 in the base 18 and away from the cutting tool 10 and the workpiece.

After performing a number of cutting operations, the first and second edges 64, 66 may become damaged or worn. It has been found that the first and second edges 64, 66 generally wear down and/or are damaged much faster than the cutting edges 46 of the teeth 40. However, to maintain the effectiveness and operational efficiency of the cutting tool 10, the cutting edges 46 of the teeth 40 and the first and second edges 64, 66 must be sharpened at the same time and must be filed an equal amount. If this is not done, the relative orientation between the cutting edges 46 of the teeth 40 and the first and second edges 64, 66 is not maintained and the cutting tool 10 does not operate efficiently or correctly.

Rather than sharpening the first and second edges 64, 66, the operator can pivot the actuator 80 about the pivot axis, moving the locking member 78 from the locked position toward the unlocked position. The operator can then remove the blade 62 and replace the blade 62 with a new blade 62.

Once the new blade 62 is inserted into the slot 70, the operator can replace the feed shaft 30 into the body 12 of the cutting tool 10 and move the actuator 80 and the locking member 78 toward the locking position. As explained above, as the locking member 78 moves toward the locked position, the locking member 78 cammingly engages the feed shaft 30 and moves the feed shaft 30 and the blade 62 toward a desired orientation with respect to the body 12 of the cutting tool 10. The operator can then resume operation of the cutting tool 10 without having to perform complicated measurements and without adversely affecting the performance of the cutting tool 10.

In some embodiments, a cutting tool body 12 and a number of differently-configured blades 62 having, for example, differently-oriented or differently-shaped cutting edges 64, 66, different material properties, etc., can be packaged together and/or offered for sale as a kit. Alternatively, or in addition, a number of differently-sized and/or differently-configured cutting tool bodies 12 (e.g., having different cutting diameters, material properties, numbers of teeth 40, tip profiles, shaft sizes and configurations, etc.) can be packaged together and sold as a kit with two or more blades 62 of different size and or configuration (e.g., having differently-oriented or differently-shaped cutting edges 64, 66, different material properties, etc.).

Alternatively, or in addition, a number of differently-sized and/or differently-configured feed shafts 30 (e.g., having different material, shaft size, thread size, thread orientation, thread pitch, etc.) can be packaged together and sold as a kit with two or more different cutting tool bodies 12 (e.g., having different cutting diameters, material properties, numbers of teeth 40, tip profiles, shaft sizes and configurations, etc.) and/or two or more different blades 62 (e.g., having different cutting diameters, material properties, number of teeth, tip profiles, etc.).

Many additional combinations of cutting tool components may be packaged together and/or offered for sale as a kit to enable a user to assemble and configure one or more cutting tools 10 to particularly suit different applications. The uses or applications may be defined by the materials to be cut (e.g., wood, mica on particle board, laminates, fiberglass over particle board, fiberglass over plywood, drywall, etc.). Alternatively, a kit may include components (such as matched feed shafts 30 and blades 62, for example) that are particularly suited for one specific use or application (e.g., material).

Figure 18:
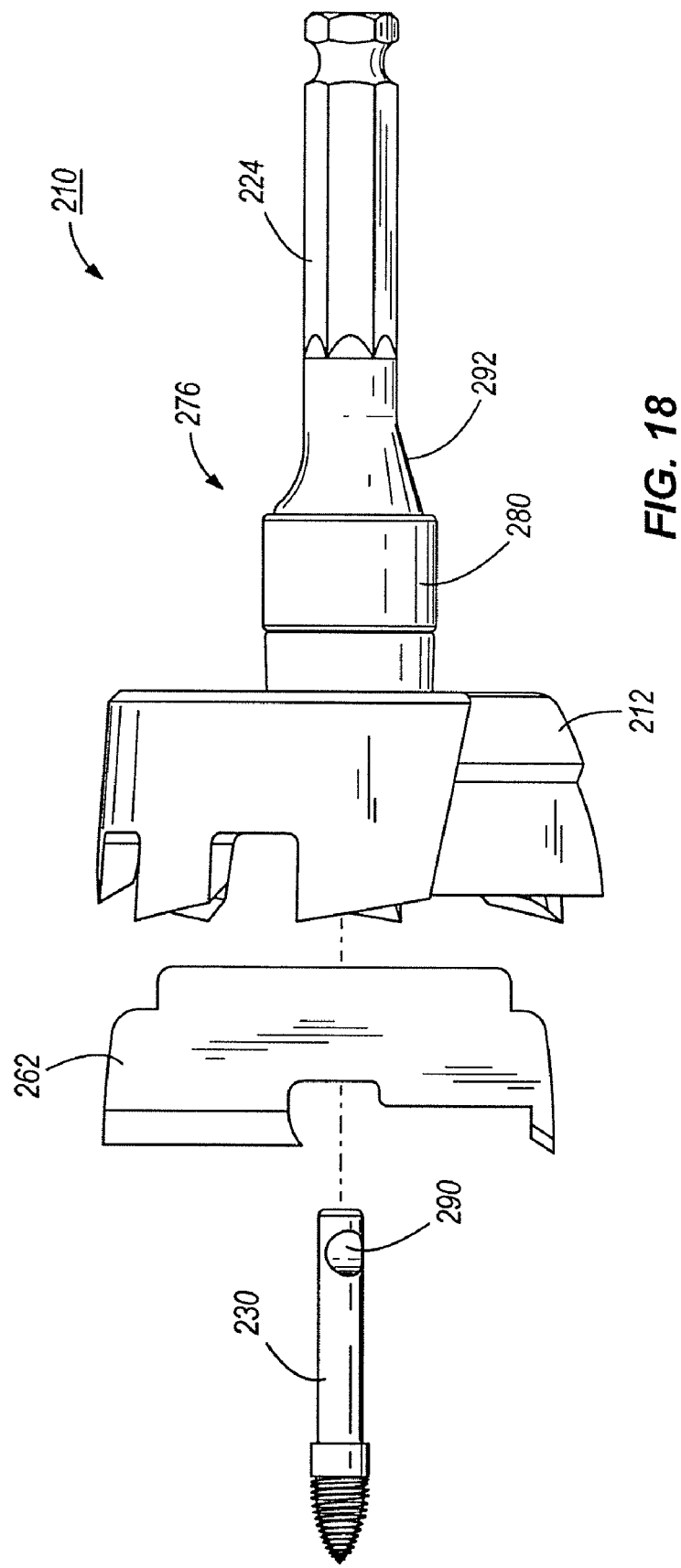
FIG. 18 is an exploded perspective view of an alternate embodiment of the cutting tool of the present invention.

FIG. 18 illustrates an alternate embodiment of a cutting tool 210 according to the present invention. The cutting tool 210 shown in FIG. 18 is similar in many ways to the illustrated embodiments of FIGS. 1-17 described above. Accordingly, with the exception of mutually inconsistent features and elements between the embodiment of FIG. 18 and the embodiments of FIGS. 1-17, reference is hereby made to the description above accompanying the embodiments of FIGS. 1-17 for a more complete description of the features and elements (and the alternatives to the features and elements) of the embodiment of FIG. 18. Features and elements in the embodiment of FIG. 18 corresponding to features and elements in the embodiments of FIGS. 1-17 are numbered in the 200 series.

In the illustrated embodiment of FIG. 18, the cutting tool 210 includes a locking mechanism 276 supported on the drive shaft 224 for securing the feed shaft 230 and/or a blade 262 in a recess in the body 212 of the cutting tool 210. In other embodiments, the locking mechanism 276 can be positioned on other portions of the cutting tool 210. In some embodiments, the locking mechanism 276 can be substantially similar to the quick-change chuck assembly described in U.S. Pat. No. 6,457,916 and/or the tool bit holder described in U.S. Pat. No. 6,561,523, the entire contents of each of which is hereby incorporated by reference.

In some embodiments, a channel extends radially through the drive shaft 224 and opens into the recess in the feed shaft 230. A locking member, such as, for example, a ball, a roller, and the like, is supported in the channel for movement between a locked position, in which the locking member extends outwardly from the channel and into the recess to secure the feed shaft 230 to the cutting tool body 212, and an unlocked position, in which the locking member is movable along the channel and out of the recess.

Figure 32:
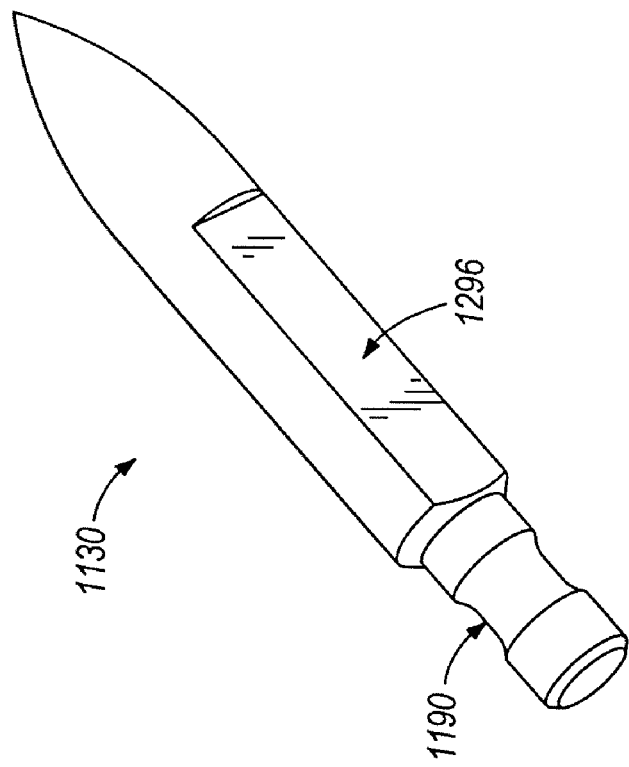
FIG. 32 is a second perspective view of the feed shaft of FIG. 31.
Figure 31:
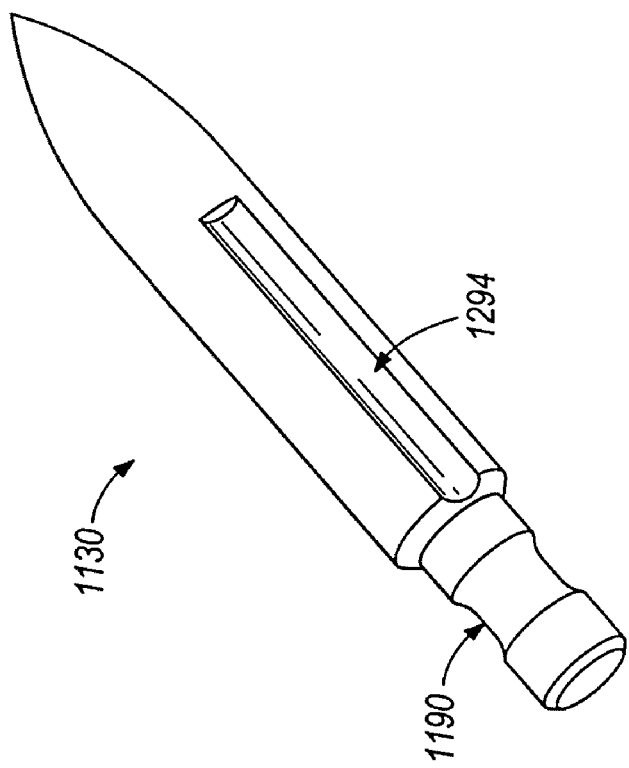
FIG. 31 is a first perspective view of a feed shaft of the cutting tool of FIG. 29.

In some such embodiments, the feed shaft 230 can include a notch 290 and the locking member can be engageable in the notch 290 to secure the feed shaft 230 in the cutting tool body 212. In the illustrated embodiment of FIG. 18, the notch 290 extends around a portion of the circumference of the feed shaft 230. In other embodiments, the notch 290 can extend around the entire circumference of the feed shaft 230 (as shown in FIGS. 31 and 32, which are discussed in further detail below).

In some embodiments, the locking mechanism 276 can include a biasing member for biasing the locking member toward the locked position. In some such embodiments, the biasing member is supported in the channel adjacent to the locking member and is operable to bias the locking member through the channel toward the recess. In other embodiments, the biasing member can be supported on an exterior surface 292 of the drive shaft 224.

As shown in FIG. 18, the locking mechanism 276 can also include an actuator 280 for moving the locking member between the locked position and the unlocked position. In the illustrated embodiment of FIG. 18, the actuator 280 is supported on the exterior surface 292 of the drive shaft 224 for axial movement along the drive shaft 224 between a first or forward-most position (shown in FIG. 18) and a second or rearward-most position. In other embodiments, the actuator 280 is supported on the exterior surface 292 of the drive shaft 224 for circumferential (i.e., relative rotational) movement along the drive shaft 224 between the first position and the second position. In still other embodiments, the actuator 280 is supported on the exterior surface 292 of the drive shaft 224 for circumferential (i.e., relative rotational) movement along the drive shaft 224 and axial movement along the drive shaft 224.

The actuator 280 can also include a radially-inwardly extending protrusion. In this manner, when the actuator 280 is moved toward the first position, the protrusion is moved into radial alignment with the channel in the drive shaft 224 and into camming engagement with the locking member to move the locking member radially inwardly along the channel toward the locked position. When the actuator 280 is moved toward the second position, the protrusion is moved out of radial alignment with the channel in the drive shaft 224 and out of engagement with the locking member so that the locking member can move radially outwardly along the channel and toward the unlocked position. The actuator 280 can also include a biasing member for biasing the actuator 280 toward the first position, or alternatively, toward the second position.

Figure 19:
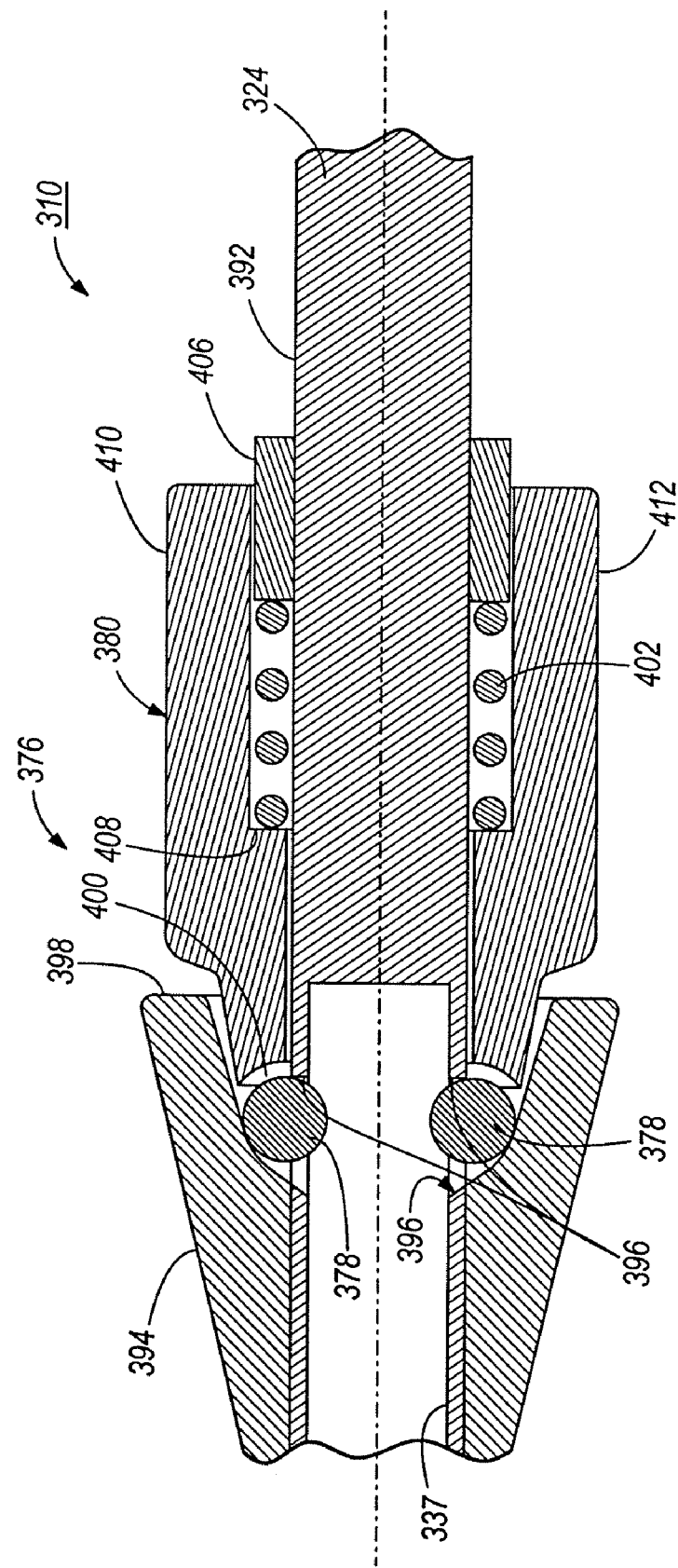
FIG. 19 is a cross-sectional view of another alternate embodiment of a portion of a cutting tool of the present invention.

FIG. 19 illustrates an alternate embodiment of a cutting tool 310 according to the present invention. The cutting tool 310 shown in FIG. 19 is similar in many ways to the illustrated embodiments of FIGS. 1-18 described above. Accordingly, with the exception of mutually inconsistent features and elements between the embodiment of FIG. 19 and the embodiments of FIGS. 1-18, reference is hereby made to the description above accompanying the embodiments of FIGS. 1-18 for a more complete description of the features and elements (and the alternatives to the features and elements) of the embodiment of FIG. 19. Features and elements in the embodiment of FIG. 19 corresponding to features and elements in the embodiments of FIGS. 1-18 are numbered in the 300 series.

In the illustrated embodiment of FIG. 19, the cutting tool 310 includes a locking mechanism 376 including a sleeve 394 supported on the exterior surface 392 of the drive shaft 324. Channels 396 extend radially through the drive shaft 324 and a portion of the sleeve 394. As shown in FIG. 19, a first end of each channel 396 opens into the recess 337 in the drive shaft 324 and a second end of each channel 396 opens axially toward a rear end 398 of the sleeve 394. Locking members 378 are supported in the channels 396 for movement between a locked position, in which the locking members 378 extend radially inwardly from the second end of the channel 396 and into the recess 337 to secure the feed shaft to the cutting tool body, and an unlocked position, in which the locking members 378 are movable along the channels 396 and out of the recess 337.

In the illustrated embodiment, the locking mechanism 376 includes two locking members 378 supported for movement along two channels 396. In other embodiments, the locking mechanism 376 can include one, three, or more locking members 378 supported for movement along one, three, or more channels 396.

As shown in FIG. 19, the locking mechanism 376 can include an actuator 380 supported on the exterior surface 392 of the drive shaft 324 for axial movement along the drive shaft 324 between a first or forward-most position (shown in FIG. 19) and a second or rearward-most position. In the illustrated embodiment of FIG. 19, the actuator 380 can also include a forwardly-extending protrusion 400.

In this manner, when the actuator 380 is moved toward the first position, the protrusion 400 is moved into camming engagement with each of the locking members 378 to move the locking members 378 forwardly and radially inwardly along the channels 396 toward the locked positions in the recess 337. When the actuator 380 is moved toward the second position, the locking members 378 can be moved radially outwardly along the channels 396 and away from the recess 337 so that the feed shaft can be removed from the cutting tool body.

In the illustrated embodiment of FIG. 19, the locking mechanism 376 also includes a biasing member 402 for biasing the actuator 380 toward the first position. As shown in FIG. 19, the biasing member 402 can be supported on the exterior surface 392 of the drive shaft 324 between a collar 406 and an interior shoulder 408 of the actuator 380.

As also shown in FIG. 19, a rearward portion 410 of the actuator 380 can extend rearwardly across the biasing member 402 to substantially enclose the biasing member 402 and to prevent debris from entering the locking mechanism 376.

In some embodiments, the outer surface 412 of the actuator 380 can be knurled and/or can include outwardly extending protrusions to provide a slip-resistant gripping surface. In these and other embodiments, the outer surface 412 of the actuator 380 or a portion of the outer surface 412 of the actuator 380 can include or be formed from an elastic material to provide a cushion grip.

Figure 20:
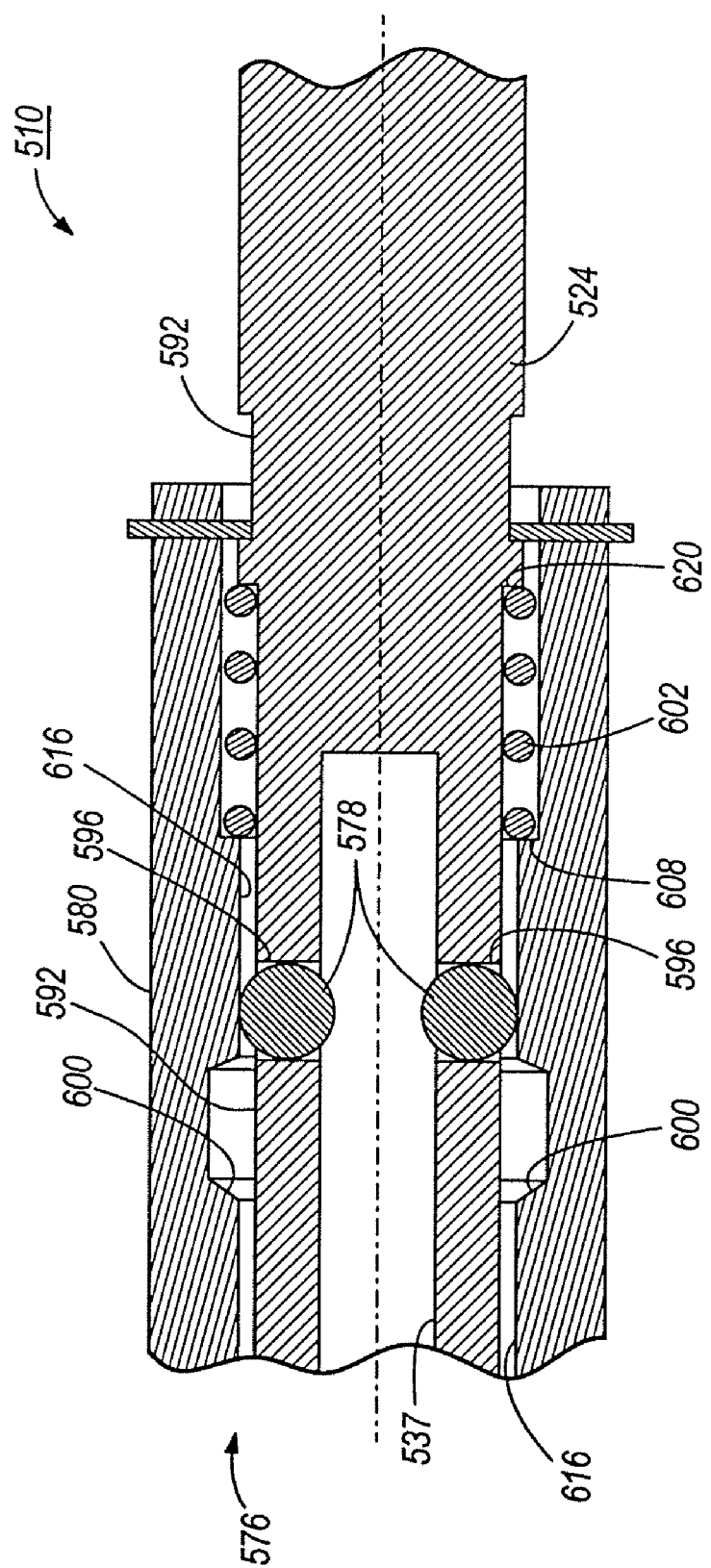
FIG. 20 is a cross-sectional view of another alternate embodiment of a portion of a cutting tool of the present invention.

FIG. 20 illustrates an alternate embodiment of a cutting tool 510 according to the present invention. The cutting tool 510 shown in FIG. 20 is similar in many ways to the illustrated embodiments of FIGS. 1-19 described above. Accordingly, with the exception of mutually inconsistent features and elements between the embodiment of FIG. 20 and the embodiments of FIGS. 1-19, reference is hereby made to the description above accompanying the embodiments of FIGS. 1-19 for a more complete description of the features and elements (and the alternatives to the features and elements) of the embodiment of FIG. 20. Features and elements in the embodiment of FIG. 20 corresponding to features and elements in the embodiments of FIGS. 1-19 are numbered in the 500 and 600 series.

In the illustrated embodiment of FIG. 20, the cutting tool 510 includes a locking mechanism 576 including an actuator 580 supported on the exterior surface 592 of the drive shaft 524. Channels 596 extend radially through the drive shaft 524. As shown in FIG. 20, locking members 578 are supported in the channels 596 for movement between a locked position, in which the locking members 578 extend radially inwardly into the recess 537 to secure the feed shaft to the cutting tool body, and an unlocked position, in which the locking members 578 are movable along the channels 596 and out of the recess 537.

As shown in FIG. 20, the locking mechanism 576 can include an actuator 580 supported on the exterior surface 592 of the drive shaft 524 for axial movement along the drive shaft 524 between a first or forward-most position (shown in FIG. 20) and a second or rearward-most position. In the illustrated embodiment of FIG. 20, the actuator 580 can also include a recess 600 extending circumferentially around an interior surface 616 of the actuator 580. In still other embodiments, the actuator 580 can also or alternatively include a recess 600 extending in a serpentine path or threaded around the drive shaft 524.

In this manner, when the actuator 580 is moved toward the first position, the interior surface 616 of the actuator 580 is moved into camming engagement with each of the locking members 578 to move the locking members 578 radially inwardly along the channels 596 toward the locked positions (shown in FIG. 20). When the actuator 580 is moved toward the second position, the recess 600 is moved into radial alignment with the channels 596 so that the locking members 578 can be moved radially outwardly along the channels 596 and away from the recess 537 so that the feed shaft can be removed from the cutting tool body.

In the illustrated embodiment of FIG. 20, the locking mechanism 576 also includes a biasing member 602 for biasing the actuator 580 toward the second position. As shown in FIG. 20, the biasing member 602 can be supported on the exterior surface 592 of the drive shaft 524 between an outwardly-extending shoulder 620 of the drive shaft 524 and an interior shoulder 608 of the actuator 580.

Figure 21:
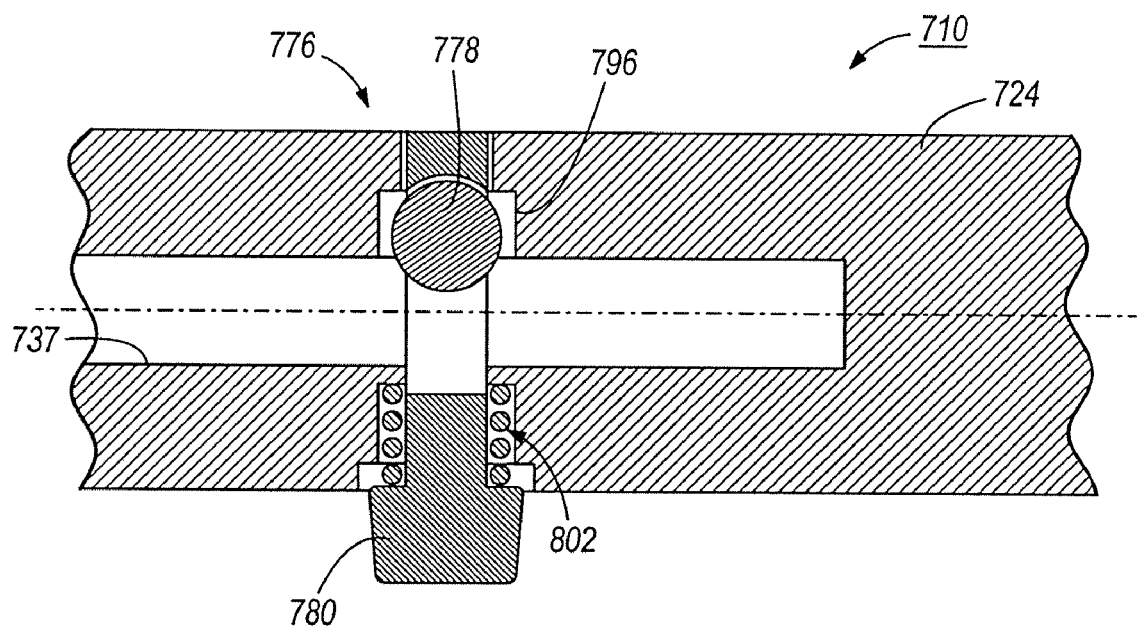
FIG. 21 is a cross-sectional view of another alternate embodiment of a portion of a cutting tool of the present invention.
Figure 22:
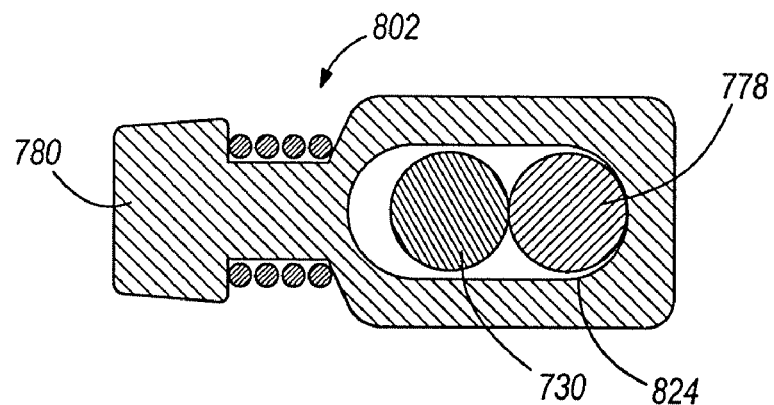
FIG. 22 is side view of a portion of the cutting tool shown in FIG. 21.

FIGS. 21 and 22 illustrate an alternate embodiment of a cutting tool 710 according to the present invention. The cutting tool 710 shown in FIGS. 21 and 22 is similar in many ways to the illustrated embodiments of FIGS. 1-21 described above. Accordingly, with the exception of mutually inconsistent features and elements between the embodiment of FIGS. 21 and 22 and the embodiments of FIGS. 1-20, reference is hereby made to the description above accompanying the embodiments of FIGS. 1-20 for a more complete description of the features and elements (and the alternatives to the features and elements) of the embodiment of FIGS. 21 and 22. Features and elements in the embodiment of FIGS. 21 and 22 corresponding to features and elements in the embodiments of FIGS. 1-20 are numbered in the 700 and 800 series.

In the illustrated embodiment of FIGS. 21 and 22, the cutting tool 710 includes a locking mechanism 776. A channel 796 extends radially through the drive shaft 724 and communicates with the recess 737 in the drive shaft 724. An actuator 780 is supported in the channel 796 for radial movement between a first position (shown in FIG. 21) and a second position. As shown in FIG. 22, the actuator 780 can include a slot 824 and can support a locking member 778 for movement along the channel 796 between a locked position, in which the locking member 778 extends radially inwardly into the recess 737 to secure the feed shaft 730 to the cutting tool body, and an unlocked position, in which the locking member 778 is movable along the channel 796 and out of the recess 737.

In the illustrated embodiment of FIGS. 21 and 22, the locking member 778 is supported for movement along the slot 824. In other embodiments, the locking member 778 can be integrally formed with the actuator 780 for movement with the actuator 780 between the first position and the second position.

When the actuator 780 of the illustrated embodiment of FIGS. 21 and 22 is moved along the channel 796 toward the first position, the locking member 778 is moved radially inwardly into the recess 737 to engage the feed shaft 730. When the actuator 780 is moved toward the second position, the locking member 778 is able to move radially outwardly along the channel 796 and out of the recess 737 toward the unlocked position. The actuator 780 can also include a biasing member 802 for biasing the actuator 780 toward the first position.

Figure 23:
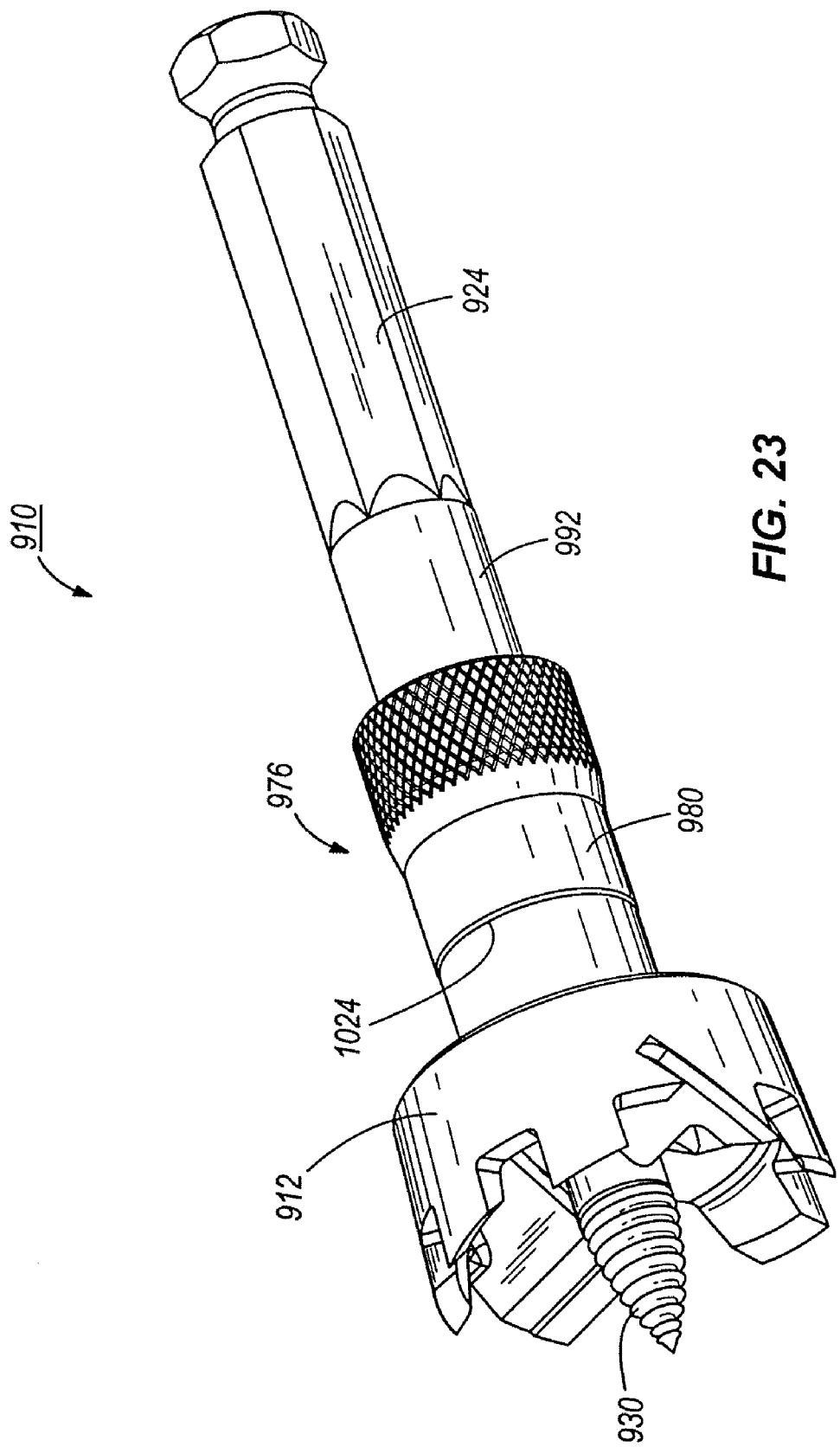
FIG. 23 is a perspective view of another alternate embodiment of a cutting tool of the present invention.
Figure 24:
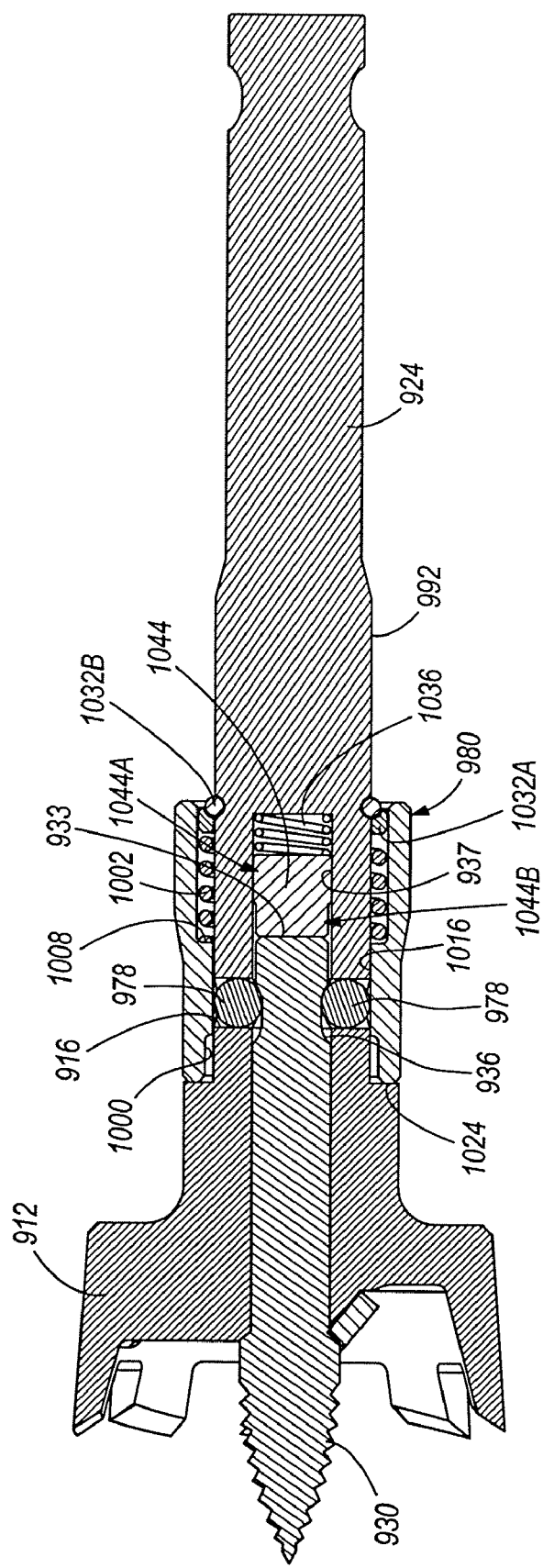
FIG. 24 is a cross-sectional view of the cutting tool shown in FIG. 23 with a locking mechanism in a locked position.
Figure 25:
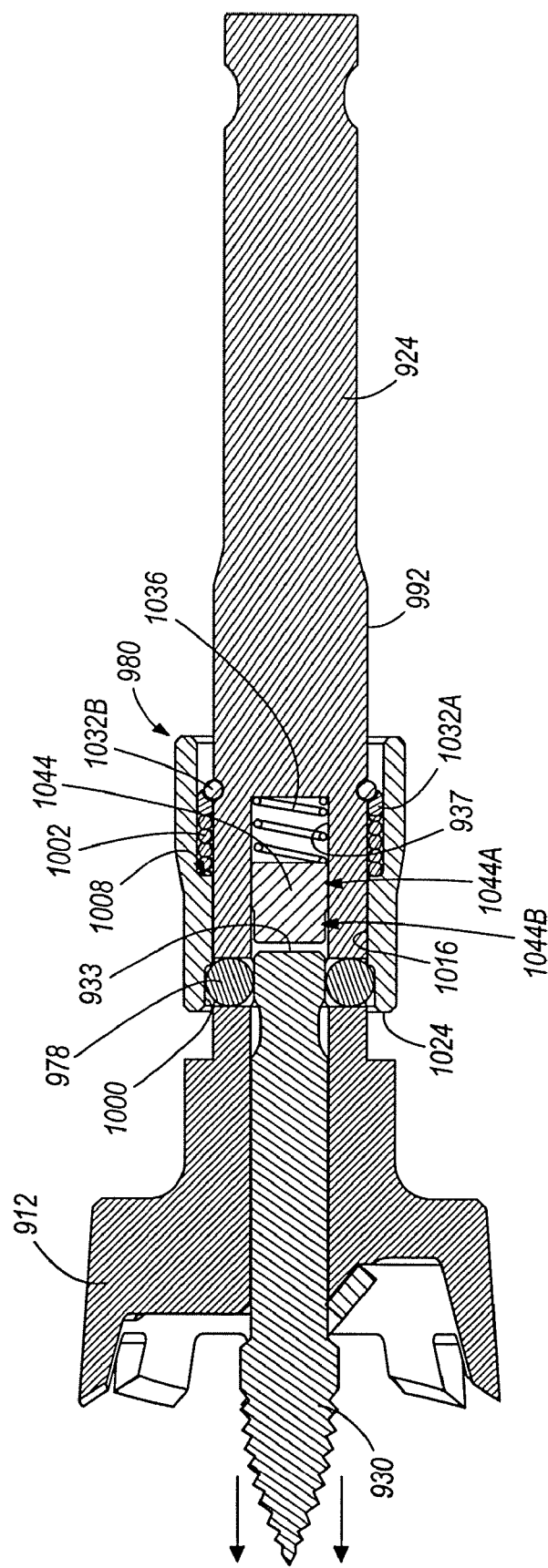
FIG. 25 is a second cross-sectional view of the cutting tool shown in FIG. 23 with the locking mechanism in an unlocked position.

FIGS. 23-25 illustrate an alternate embodiment of a cutting tool 910 according to the present invention. The cutting tool 910 shown in FIGS. 23-25 is similar in many ways to the illustrated embodiments of FIGS. 1-22 described above. Accordingly, with the exception of mutually inconsistent features and elements between the embodiment of FIGS. 23-25 and the embodiments of FIGS. 1-22, reference is hereby made to the description above accompanying the embodiments of FIGS. 1-22 for a more complete description of the features and elements (and the alternatives to the features and elements) of the embodiment of FIGS. 23-25. Features and elements in the embodiment of FIGS. 23-25 corresponding to features and elements in the embodiments of FIGS. 1-22 are numbered in the 900 and 1000 series.

In the illustrated embodiment of FIGS. 23-25, the cutting tool 910 includes a locking mechanism 976. The locking mechanism 976 can include locking members 978 and an actuator 980 supported on the exterior surface 992 of the drive shaft 924 for axial movement along the drive shaft 924 between a first or forward-most position (shown in FIG. 24) and a second or rearward-most position (shown in FIG. 25). In the illustrated embodiment of FIGS. 23-25, the actuator 980 can also include a recess 1000 extending circumferentially around an interior surface 1016 of the actuator 980 at its forward end 1024. In the illustrated embodiment of FIGS. 23-25, the recess 1000 extends to the forward end 1024 of the actuator 980.

Channels 996 are defined between the base 916 of the cutting tool body 912 and a forward end of the drive shaft 924. In the illustrated embodiment of FIGS. 23-25, two channels 996 are spaced around the circumference of the drive shaft 924 by about 180 degrees and extend radially through the exterior surface 992 of the drive shaft 924 and open into the recess 937. In other embodiments, the channels 996 can have other relative locations and orientations.

In this manner, when the actuator 980 is moved toward the first position, the interior surface 1016 of the actuator 980 is moved into camming engagement with each of the locking members 978 to move the locking members 978 radially inwardly along channels 996 toward the locked positions (shown in FIG. 24). When the actuator 980 is moved toward the second position, the recess 1000 is moved into radial alignment with the channels 996 so that the locking members 978 can be moved radially outwardly along the channels 996 and out of the recess 936 of the feed shaft 930 so that the feed shaft 930 can be removed from the cutting tool body 912.

In the illustrated embodiment of FIGS. 23-25, the locking mechanism 976 also includes a biasing member 1002 for biasing the actuator 980 toward the first position. As shown in FIGS. 24 and 25, the biasing member 1002 can be supported on the exterior surface 992 of the drive shaft 924 between an interior shoulder 1008 of the actuator 980 and a pair of retaining members 1032A and 1032B.

A second biasing member 1036 is positioned in the recess 937 of the drive shaft 924 that receives the feed shaft 930. A slug 1044 is positioned in the recess 937 adjacent the second biasing member 1036. When the feed shaft 930 is inserted into the recess 937 and the locking mechanism 976 is moved into a locked position, the slug 1044 is contacted by the second end 933 of the feed shaft 930, and the second biasing member 1036 is compressed. When the locking mechanism 976 is unlocked, the second biasing member 1036 urges the feed shaft 930 out of the recess 937 and away from the drive shaft 924 so that the feed shaft 930 is released from the locking engagement with the locking members 978.

In some embodiments, the slug 1044 includes a base portion 1044A and an engaging portion 1044B. The base portion 1044A and the engaging portion 1044B may be integrally-formed or alternately, may be separately-formed and coupled together by any suitable means (e.g., adhesive, welded, threaded engagement, etc.). In the illustrated embodiment, the base portion 1044A has a larger outer profile than the engaging portion 1044B. As such, the base portion 1044A may engage the locking members 978 when the feed shaft 930 is released to retain the slug 1044 within the recess 937. Alternately, the slug 1044 may be retained by the second biasing member 1036, opposite ends of which can be connected to the base portion 1044A and to the recess 937.

In some embodiments, the slug 1044 can be magnetically connected to the feed shaft 930. In some such embodiments, the engaging portion 1044B can include or support a magnet operable to maintain the feed shaft 930 connected to the slug 1044 and to the drive shaft 924 after the feed shaft 930 has been released from the locking engagement of the locking members 978. To remove the feed shaft 930, a user can grasp the feed shaft 930 and decouple it from the engaging portion 1044B of the slug 1044.

Figure 26:
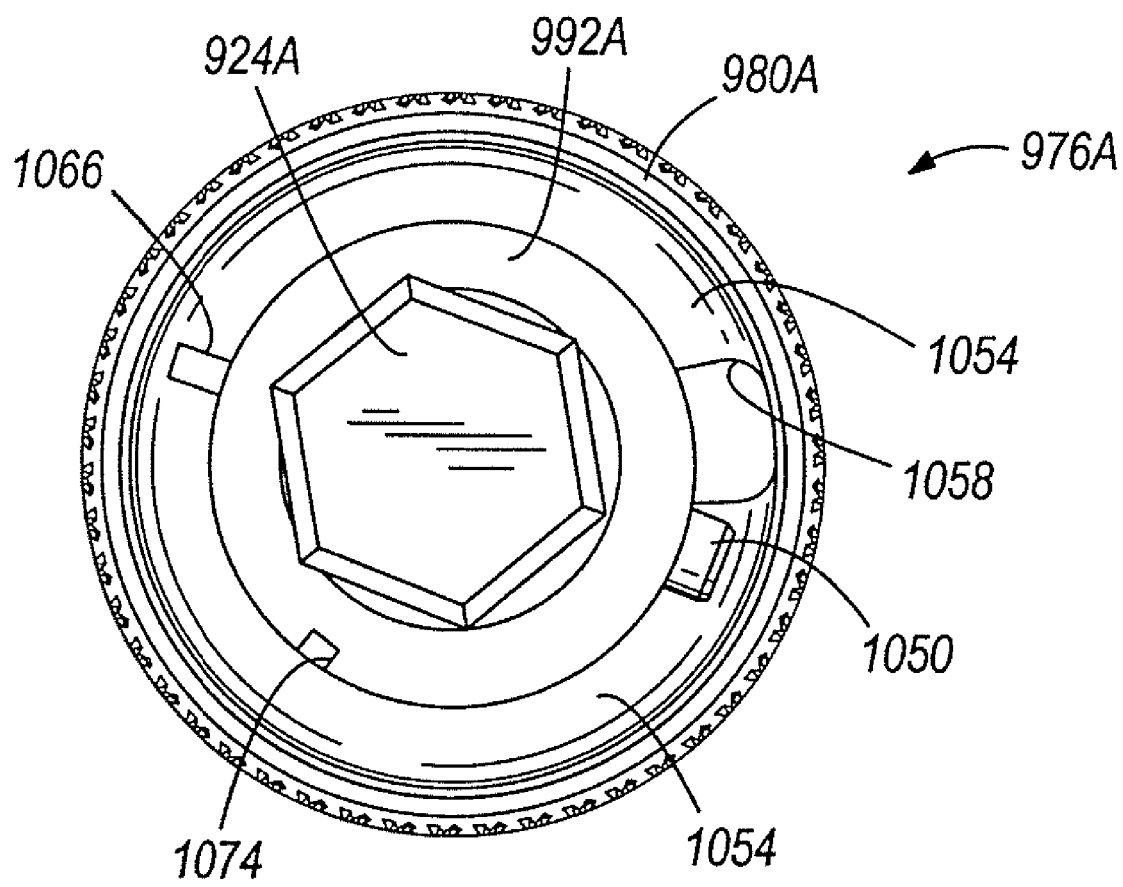
FIG. 26 is a top view of an alternate locking mechanism for the cutting tool shown in FIG. 23.
Figure 27:
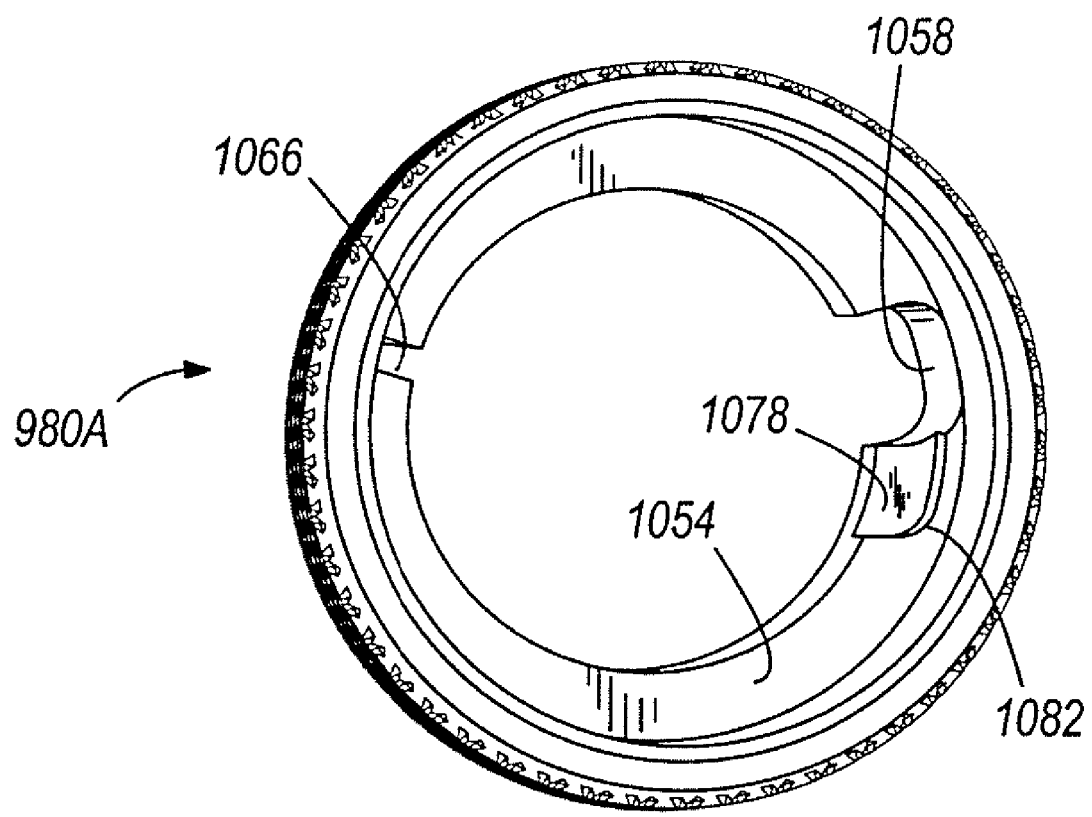
FIG. 27 is a perspective view of an actuator of the locking mechanism shown in FIG. 26.
Figure 28:
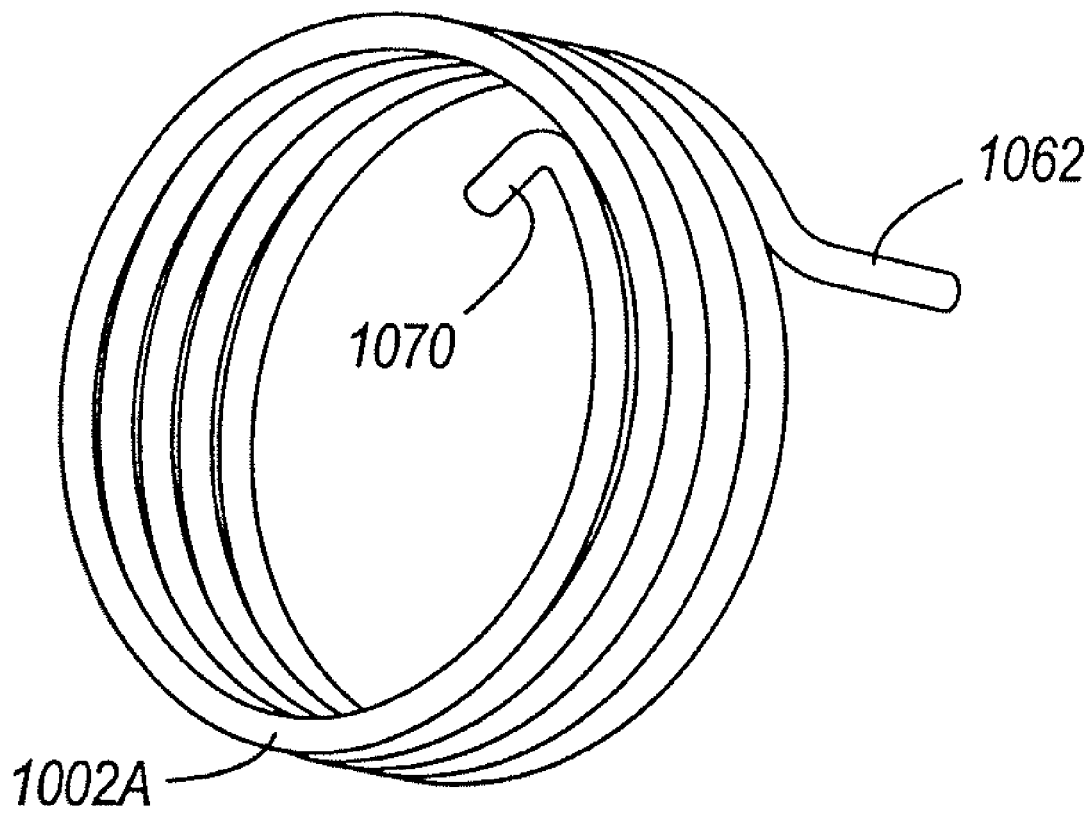
FIG. 28 is a perspective view of a biasing member of the locking mechanism shown ill FIG. 26.

In some embodiments, the cutting tool 910 of FIG. 23 is provided with an alternate locking mechanism 976A as illustrated in FIGS. 26-28. The locking mechanism 976A is similar to the locking mechanism 976 shown in the figures and described above, except for the particular features described below. Additionally, the feed shaft 924A may include additional features as compared to the feed shaft 924 described above.

Figure 2:
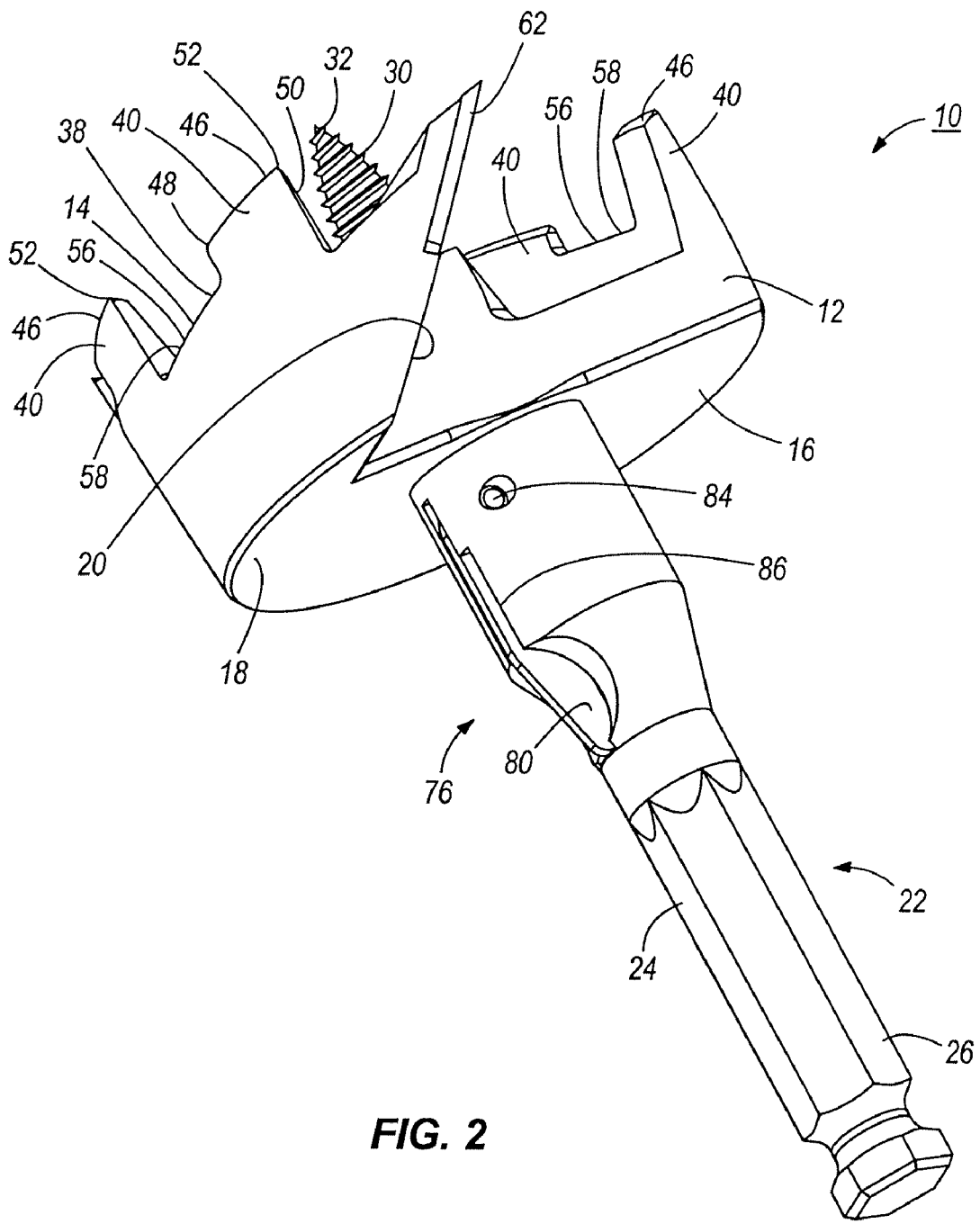
FIG. 2 is a side view the cutting tool shown in FIG. 1 with a locking arrangement in a locked position.
Figure 3:
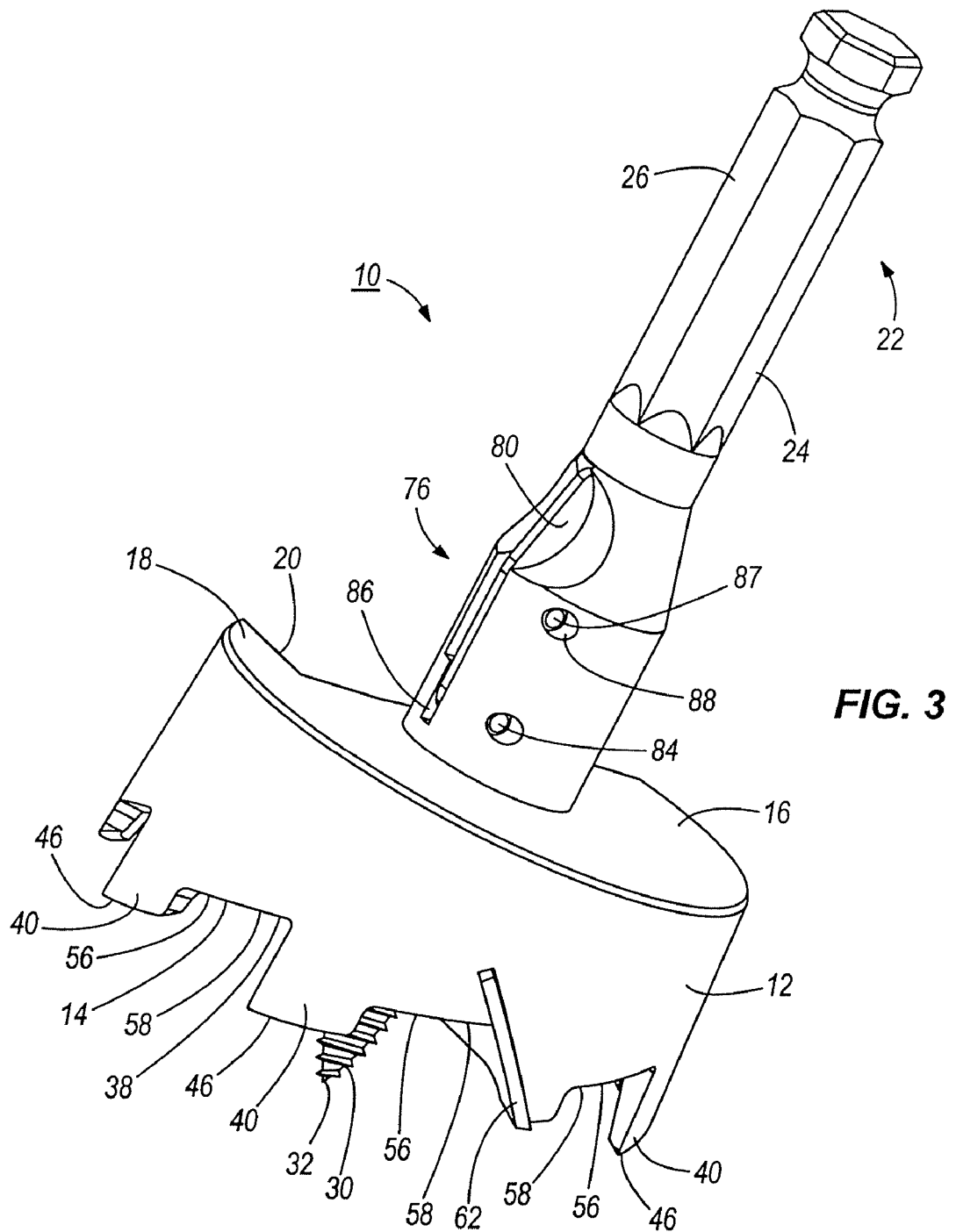
FIG. 3 is a rear perspective view the cutting tool shown in FIG. 1 with the locking mechanism in the locked position.
Figure 4:
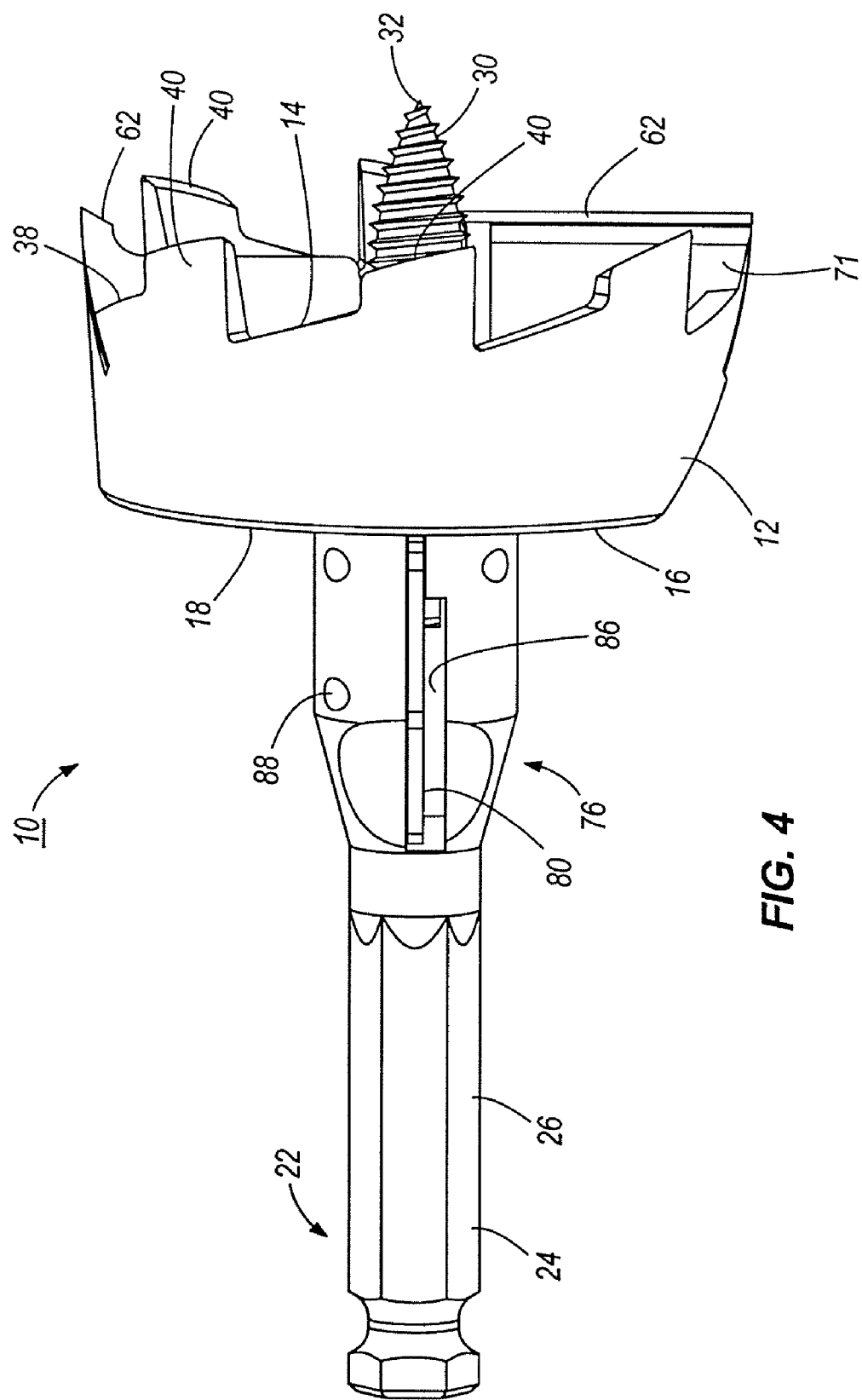
FIG. 4 is a top view the cutting tool shown in FIG. 1 with the locking mechanism in the locked position.

A pin 1050 extends radially outwardly from the exterior surface 992A of the drive shaft 924A and into the interior of the actuator 980A. As shown in FIGS. 26 and 2, tie actuator 980A can include an interior ledge 1054 extending around a majority of the circumference of the actuator 980A. A gap or slot 1058 is provided in the interior ledge 1054 adjacent the pill 1050. A biasing member 1002A (FIG. 28) is positioned within the actuator 980A and around the exterior surface 992A of the drive shaft 924A. The biasing member 1002A is omitted from FIG. 26 for the purpose of clarity. The biasing member 1002A includes a first end 1062 that engages a retaining slot 1066 in the actuator 980A and a second end 1070 that engages a recess 1074 (FIG. 26) in the exterior surface 992A of the drive shaft 924A.

The biasing member 1002A can provide a torsion biasing force to bias the actuator 980A toward the orientation shown in FIG. 26 relative to the drive shaft 924A. In this orientation, the slot 1058 is out of axial alignment with the pin 1050, and the actuator 980A cannot be axially moved from the first (forward) position to the second (rearward) position to unlock the locking mechanism 976A. In some embodiments, the biasing member 1002A additionally provides an axially biasing force to bias the actuator 980A toward the first position.

In order to move the actuator 980A from the first position toward the second position, the actuator 980A is rotated against the force of the biasing member 1002A and relative to the drive shaft 924A to axially align the slot 1058 with the pin 1050 and then the actuator 980A may be moved axially relative to the drive shaft 924A into the second position. In a similar manner to the locking mechanism 976 described above, the second position of the actuator 980A allows the feed shaft 930 to be released. In addition, the torsional biasing of the actuator 980A (counter-clockwise as viewed in FIG. 26) relative to the drive shaft 924A inhibits incidental unlocking of the locking mechanism 976A. For example, if at any time the actuator 980A contacts the workpiece or loose chips of the workpiece during operation, the actuator 980A will be prevented from being moved from the first position to the second position. In fact, due to the rotation of the cutting tool 910, contact with the workpiece further urges the actuator 980A torsionally in the same direction as the biasing member 1002A. A pocket 1078 (FIG. 27) in the interior ledge 1054 defines a shoulder 1082 that engages the pin 1050 and limits the rotational movement of the actuator 980A relative to the drive shaft 924A.

FIGS. 29-32 illustrate an alternate embodiment of a cutting tool 1110 according to the present invention. The cutting tool 1110 shown in FIGS. 29-32 is similar in many ways to the illustrated embodiments of FIGS. 1-28 described above. Accordingly, with the exception of mutually inconsistent features and elements between the embodiment of FIGS. 29-32 and the embodiments of FIGS. 1-28, reference is hereby made to the description above accompanying the embodiments of FIGS. 1-28 for a more complete description of the features and elements (and the alternatives to the features and elements) of the embodiment of FIGS. 29-32. Features and elements in the embodiment of FIGS. 29-32 corresponding to features and elements in the embodiments of FIGS. 1-28 are numbered in the 1100 and 1200 series.

Figure 29:
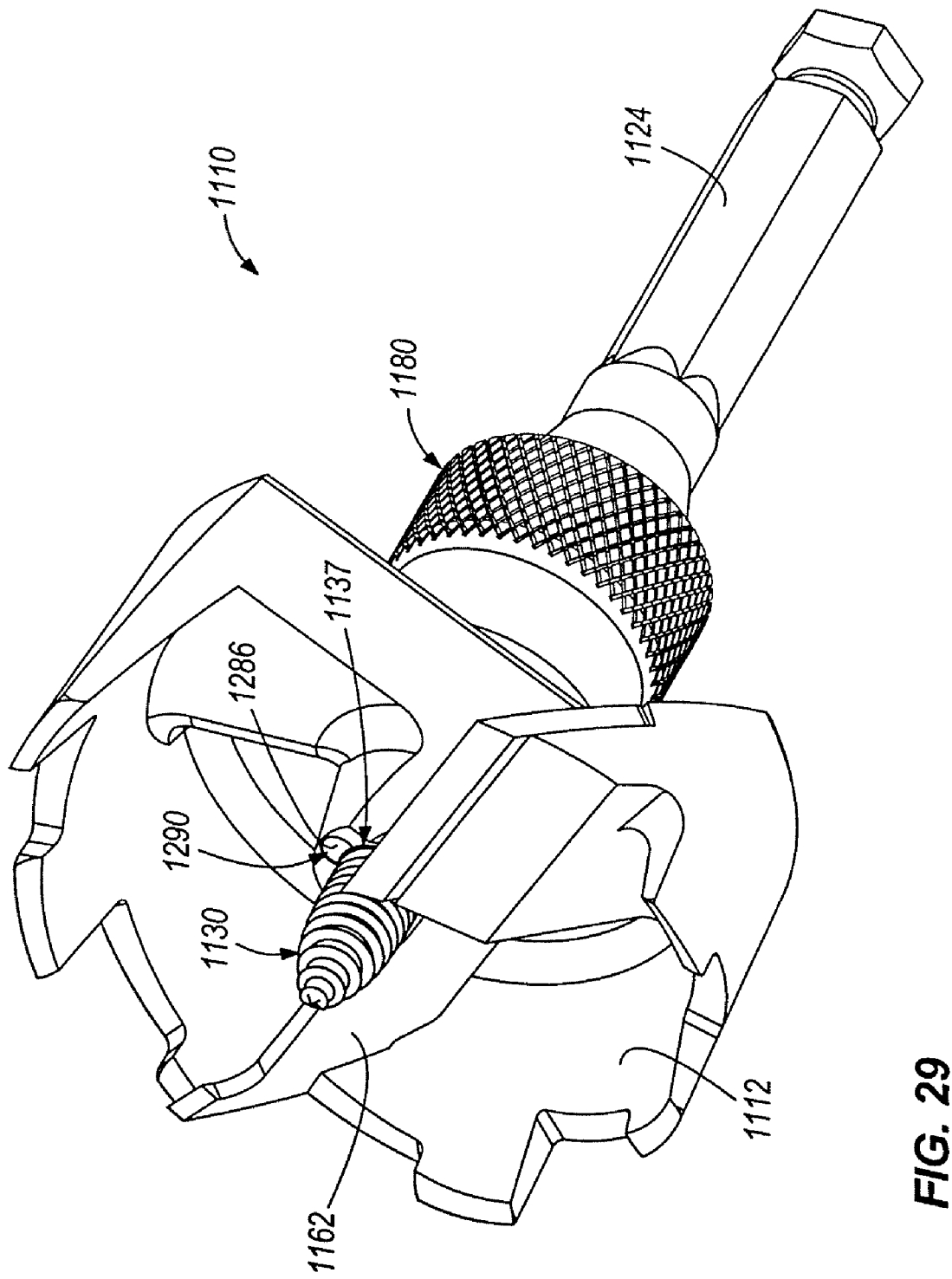
FIG. 29 is a perspective view of another alternate embodiment of a cutting tool of the present invention.
Figure 30:
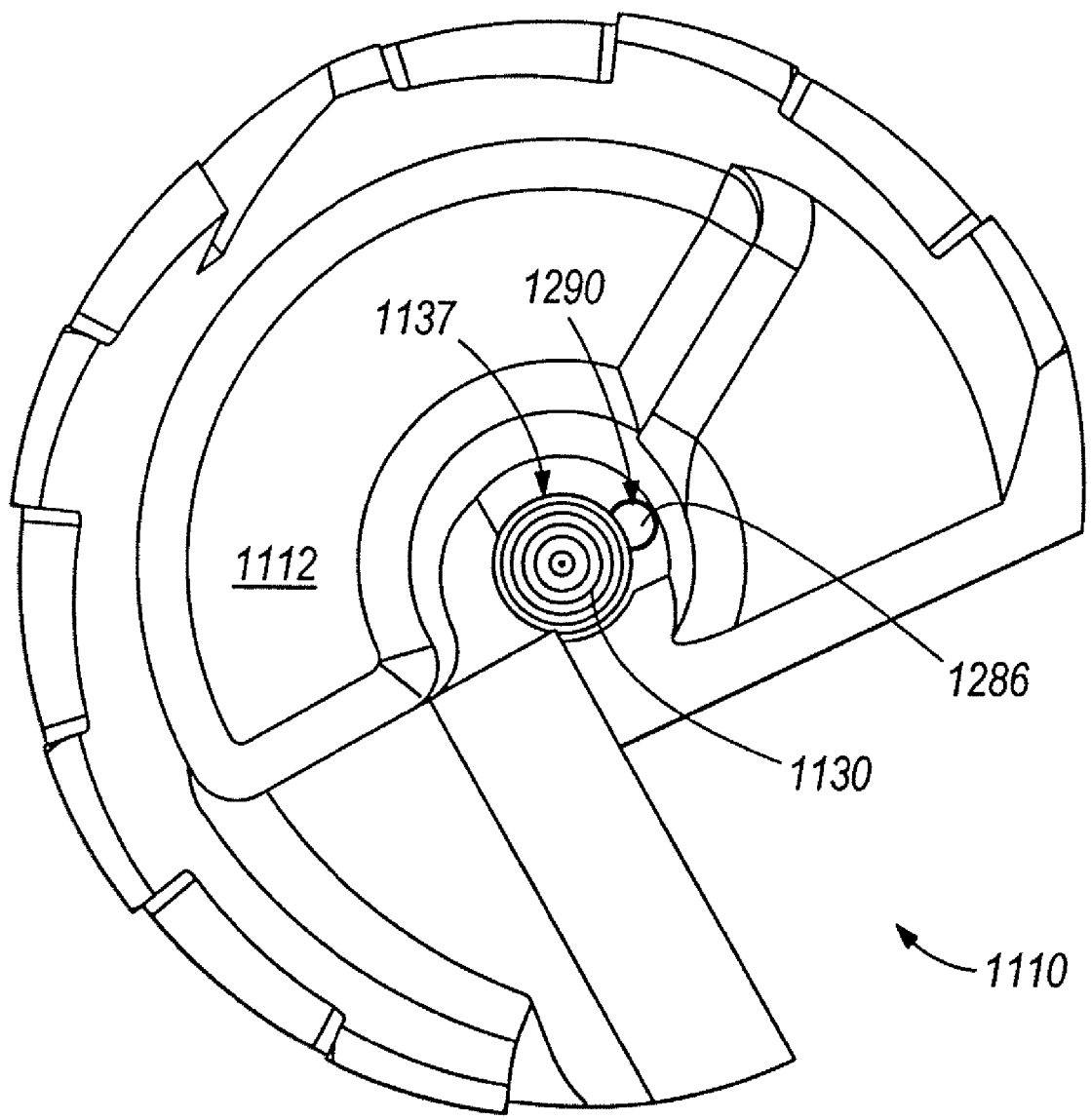
FIG. 30 is a front view of the cutting tool of FIG. 29.

As shown in FIGS. 29-32, the feed shaft 1130 is fixed against rotational movement relative to the cutting tool body 1112 by a key 1286 and keyway 1290, both of which have circular cross-sections in the illustrated embodiment, but each of which may alternately have a cross-sectional shape that is rectangular, polygonal, elliptical, etc. in other embodiments. The keyway 1290 can be a blind hole adjacent to and connecting with the recess 1137. In the illustrated embodiment, the keyway 1290 extends axially through the cutting tool body 1112 in a direction substantially parallel to the recess 1137. The keyway 1290 can be configured to receive the key 1286 therein. As shown in FIGS. 29 and 30, the key 1286 is a cylindrical pin having an outer diameter sized to closely and frictionally engage the wall of the keyway 1290. In some embodiments, key 1286 is sized to provide an interference fit with the keyway 1290.

The feed shaft 1130, as best shown in FIG. 31, may include an axially-extending keyway 1294 (e.g., slot, scallop, etc.) configured to receive the key 1286. In the illustrated embodiment, the keyway 1294 in the feed shaft 1130 is a rounded scallop shaped to receive the cylindrical-shaped key 1286. In other embodiments, the keyway 1294 may have another shape, depending on the shape of the key 1286.

FIG. 32 illustrates another side of the feed shaft 1130, which includes a flat 1296. The flat 1296 may provide clearance for the blade 1162 and/or an engagement surface for the same. FIGS. 31 and 32 illustrate a notch or annular groove 1190 that extends fully around a circumference of the feed shaft 1130 and is engageable by one or more locking members, as described above.

The embodiments described above and illustrated in the figures are presented by way of example only and are not intended as a limitation upon the concepts and principles of the present invention.

What is claimed is:

1. A cutting tool for a power tool, the cutting tool comprising:
   a tool body having a first end and a second end and an axis extending therebetween, the second end being engageable with the power tool;
   a feed screw supported in the tool body and extending outwardly beyond the first end to engage a workpiece; and
   a cutting blade removably supported in the tool body substantially between the first and second ends, a portion of the cutting blade extending outwardly beyond the first end for engaging the workpiece,
   wherein the feed screw engages the cutting blade to secure the cutting blade within the tool body, the cutting blade being removable from the tool body when the feed screw disengages the cutting blade.

2. The cutting tool of claim 1, wherein the tool body includes a plurality of teeth positioned along and extending outwardly from the first end.

3. The cutting tool of claim 1, further comprising a locking mechanism for removably securing the feed screw in the tool body.

4. The cutting tool of claim 3, wherein the locking mechanism is movable between a locked position, in which the locking mechanism secures the feed screw to the tool body, and an unlocked position, in which the feed screw is removable from the tool body.

5. The cutting tool of claim 4, wherein the locking mechanism includes a locking member, which is lockingly engageable with the feed screw to secure the blade in the tool body.

6. The cutting tool of claim 5, wherein the feed screw is removably supported in the tool body.

7. The cutting tool of claim 1, wherein the cutting blade includes a first cutting edge supportable adjacent a radially-outermost portion of the first end of the tool body and a second cutting edge extending radially across the first end of the tool body from the axis toward the radially-outermost portion.

8. A method of assembling a cutting tool for a power tool, the method comprising:
   providing a tool body having a first end and a second end and an axis extending therebetween, the second end being engageable with the power tool;
   coupling a feed screw to the tool body such that the feed screw extends outwardly beyond the first end to engage a workpiece;
   positioning a cutting blade within the tool body substantially between the first and second ends, a portion of the cutting blade extending outwardly beyond the first end for engaging the workpiece; and
   engaging the cutting blade with the feed screw to secure the cutting blade within the tool body, the cutting blade being removable from the tool body when the feed screw disengages the cutting blade.

9. A cutting tool for a power tool, the cutting tool comprising:
   a tool body having a first end and a second end and an axis extending therebetween, the second end being engageable with the power tool; and
   a cutting blade removably supported in the tool body substantially between the first and second ends, the cutting blade including a first cutting edge supportable adjacent a first radially-outermost portion of the first end of the tool body and a second cutting edge extending radially across the first end of the tool body from the axis toward a second radially-outermost portion, the second radially-outermost portion being located diametrically opposite the first radially-outermost portion.

10. The cutting tool of claim 9, wherein the first cutting edge extends axially outwardly from the first end of the tool body about 0.02 inches further than the second cutting edge.

11. The cutting tool of claim 9, further comprising a plurality of teeth extending outwardly from the first end of the tool body.

12. The cutting tool of claim 11, wherein the first cutting edge of the blade provides a cutting edge of one of the plurality of teeth.

13. The cutting tool of claim 1, further comprising a locking mechanism for removably securing the blade in the tool body.

14. The cutting tool of claim 13, wherein the locking mechanism is movable between a locked position, in which the locking mechanism secures the blade to the tool body, and an unlocked position, in which the blade is removable from the tool body.

15. The cutting tool of claim 9, further comprising a feed screw supported in the tool body and extending outwardly beyond the first end to engage the workpiece.

16. The cutting tool of claim 15, further comprising a locking mechanism for removably securing the feed screw in the tool body.

17. The cutting tool of claim 16, wherein the locking mechanism is movable between a locked position, in which the locking mechanism secures the feed screw to the tool body, and an unlocked position, in which the feed screw is removable from the tool body.

18. A method of assembling a cutting tool for a power tool, the method comprising:
   providing a tool body having a first end and a second end and an axis extending therebetween, the second end being engageable with the power tool; and
   removably coupling a cutting blade within the tool body substantially between the first and second ends, the cutting blade including a first cutting edge supportable adjacent a first radially-outermost portion of the first end of the tool body and a second cutting edge extending radially across the first end of the tool body from the axis toward a second radially-outermost portion, the second radially-outermost portion being located diametrically opposite the first radially-outermost portion.

* * * * *